(12) United States Patent
Chen et al.

(10) Patent No.: US 9,437,370 B2
(45) Date of Patent: Sep. 6, 2016

(54) LITHIUM-ION CELL HAVING A HIGH-CAPACITY ANODE AND A HIGH-CAPACITY CATHODE

(75) Inventors: Guorong Chen, Fairborn, OH (US);
Aruna Zhamu, Centerville, OH (US);
Xiging Wang, Cincinnati, OH (US);
Bor Z. Jang, Centerville, OH (US);
Yanbo Wang, Fairborn, OH (US); Qing Fang, Fairborn, OH (US)

(73) Assignee: Nanotek Instruments, Inc., Dayton, OH (US)

( * ) Notice: Subject to any disclaimer, the term of this patent is extended or adjusted under 35 U.S.C. 154(b) by 1162 days.

(21) Appl. No.: 13/385,561

(22) Filed: Feb. 27, 2012

(65) Prior Publication Data

US 2013/0224603 A1 Aug. 29, 2013

(51) Int. Cl.

| | |
|---|---|
| *H01M 4/583* | (2010.01) |
| *H01M 10/00* | (2006.01) |
| *H01M 4/40* | (2006.01) |
| *H01M 4/44* | (2006.01) |
| *H01M 4/46* | (2006.01) |
| *H01M 4/505* | (2010.01) |
| *H01M 4/525* | (2010.01) |
| *H01M 4/485* | (2010.01) |
| *H01M 4/38* | (2006.01) |
| *H01M 4/42* | (2006.01) |
| *H01G 11/50* | (2013.01) |
| *B82Y 30/00* | (2011.01) |

(Continued)

(52) U.S. Cl.
CPC .............. *H01G 11/50* (2013.01); *B82Y 30/00* (2013.01); *H01M 4/386* (2013.01); *H01M 4/387* (2013.01); *H01M 4/483* (2013.01); *H01M 4/587* (2013.01); *H01M 4/625* (2013.01); *H01M 4/485* (2013.01); *Y02E 60/13* (2013.01)

(58) Field of Classification Search
CPC ..... B82Y 30/00; H01G 11/50; H01M 4/386; H01M 4/387; H01M 4/483; H01M 4/485; H01M 4/587; H01M 4/625; Y02E 60/13
See application file for complete search history.

(56) References Cited

U.S. PATENT DOCUMENTS 5,989,743 A * 11/1999 Yamashita ................ 429/129
2007/0092432 A1 * 4/2007 Prud'Homme et al. ...... 423/448

(Continued)

OTHER PUBLICATIONS

B. Z. Jang, C. Liu, D. Neff, Z. Yu, M. C. Wang, W. Xiong, and A. Zhamu. Supporting Information for Graphene Surface-Enabled Lithium Ion-Exchanging Cells: Next-Generation High-Power Energy Storage Devices, Aug. 8, 2011, 1-17.*

(Continued)

*Primary Examiner* — Carlos Barcena

(57) ABSTRACT

A lithium-ion cell comprising: (A) a cathode comprising graphene as the cathode active material having a surface area to capture and store lithium thereon and wherein said graphene cathode is meso-porous having a specific surface area greater than 100 m²/g; (B) an anode comprising an anode active material for inserting and extracting lithium, wherein the anode active material is mixed with a conductive additive and/or a resin binder to form a porous electrode structure, or coated onto a current collector in a coating or thin film form; (C) a porous separator disposed between the anode and the cathode; (D) a lithium-containing electrolyte in physical contact with the two electrodes; and (E) a lithium source disposed in at least one of the two electrodes when the cell is made. This new Li-ion cell exhibits an unprecedentedly high energy density.

17 Claims, 11 Drawing Sheets

(51) Int. Cl.
*H01M 4/48* (2010.01)
*H01M 4/587* (2010.01)
*H01M 4/62* (2006.01)

(56) References Cited

U.S. PATENT DOCUMENTS

| | | |
|---|---|---|
| 2009/0176159 A1 | 7/2009 | Zhamu et al. |
| 2009/0186276 A1 | 7/2009 | Zhamu et al. |
| 2009/0305135 A1 | 12/2009 | Shi et al. |
| 2010/0021819 A1 | 1/2010 | Zhamu et al. |
| 2012/0282527 A1* | 11/2012 | Amine et al. ............... 429/231.8 |

OTHER PUBLICATIONS

U.S. Appl. No. 12/930,294, filed Jan. 2011, A. Zhamu, et al.
U.S. Appl. No. 12/928,927, filed Dec. 23, 2010, A. Zhamu, et al.
U.S. Appl. No. 12/806,679, filed Sep. 9, 2010, C. G. Liu, et al.
U.S. Appl. No. 12/924,211, filed Sep. 23, 2010, C. G. Liu, et al.
U.S. Appl. No. 13/199,713, filed Sep. 7, 2011, A. Zhamu, et al.
U.S. Appl. No. 11/800,728, filed May 8, 2007, A. Zhamu, et al.
U.S. Appl. No. 13/374,321, filed Dec. 21, 2011, A. Zhamu, et al.
U.S. Appl. No. 13/374,894, filed Jan. 23, 2012, A. Zhamu, et al.
B. Z. Jang, et al. "Graphene Surface-Enabled Lithium Ion-Exchanging Cells: Next-Generation High-Power Energy Storage Devices," Nano Letters, 11 (2011) 3785-3791.
Guo, P. et al. "Electrochemical performance of graphene nanosheets as anode material for lithium-ion batteries," Electrochem. Comm. 11, 1320-1324 (2009).
Bhardwaj, T., et al., "Enhanced Electrochemical Lithium Storage by Graphene Nanoribbons," J. Am. Chem. Soc. 132, 12556-12558 (2010).
Lian, P. et al. "Large reversible capacity of high quality graphene sheets as an anode material for lithium ion batteries," Electrochim. Acta 55, 3909-3914 (2010).
Wu, Z.-S. et al, "Doped graphene sheets as anode materials with superhigh rate and large capacity for lithium ion batteries," ACS Nano 5, 5463-5471 (2011).

* cited by examiner

LITHIUM-ION CELL HAVING A HIGH-CAPACITY ANODE AND A HIGH-CAPACITY CATHODE

The present invention is based on the research results of a US NSF SBIR project.

This application claims the benefits of the following applications: (1) Aruna Zhamu, et al., "Surface-Mediated Lithium Ion-Exchanging Energy Storage Device," U.S. patent application Ser. No. 13/199,450 (Aug. 30, 2011). (2) Aruna Zhamu, et al., "Partially Surface-Mediated Lithium Ion-Exchanging Cells and Method of Operating Same," U.S. patent application Ser. No. 13/199,713 (Sep. 7, 2011). (3) Aruna Zhamu, et al., "Stacks of Internally Connected Surface-Mediated Cells and Methods of Operating Same," U.S. patent application Ser. No. 13/374,321 (Dec. 21, 2011). (4) Aruna Zhamu, Guorong Chen, X. Q. Wang, Yanbo Wang, and B. Z. Jang, "Hybrid Electrode and Surface-Mediated Cell-based Super-Hybrid Energy Storage Device Containing Same," U.S. patent application Ser. No. 13/374,408 (Dec. 29, 2011).

FIELD OF THE INVENTION

This invention relates generally to the field of lithium-ion battery and, more particularly, to a lithium-ion cell having a graphene-based high-capacity cathode.

BACKGROUND OF THE INVENTION

The following list of references is herein cited as part of the background information:

1. A. Zhamu, et al., "Graphene nanocomposites for electrochemical cell electrodes," U.S. patent application Ser. No. 12/220,651 (Jul. 28, 2008); US Pub. No. 20100021819 (Jan. 28, 2010).
2. Guo, P. et al. "Electrochemical performance of graphene nanosheets as anode material for lithium-ion batteries," *Electrochem. Comm.* 11, 1320-1324 (2009).
3. Bhardwaj, T., et al., "Enhanced Electrochemical Lithium Storage by Graphene Nanoribbons," *J. Am. Chem. Soc.* 132, 12556-12558 (2010).
4. Lian, P. et al. "Large reversible capacity of high quality graphene sheets as an anode material for lithium ion batteries," *Electrochim. Acta* 55, 3909-3914 (2010).
5. Wu, Z.-S., "Doped graphene sheets as anode materials with superhigh rate and large capacity for lithium ion batteries," *ACS Nano* 5, 5463-5471 (2011).
6. A. Zhamu, et al., "Mixed nano-filament electrode materials for lithium ion batteries," US Pub. No. 20090176159 (Jul. 9, 2009).
7. A. Zhamu, et al., "Hybrid nano-filament cathode compositions for lithium metal or lithium ion batteries," US Pub. No. 20090186276 (Jul. 23, 2009).
8. J. Shi, et al., "Conductive nanocomposite-based electrodes for lithium batteries," US Pub. No. 20090305135 (Dec. 10, 2009).
9. A. Zhamu, et al., "Nano graphene reinforced nanocomposite particles for lithium battery electrodes," US Pub. No. 20100143798 (Jun. 10, 2010).
10. C. G. Liu, et al., "Lithium Super-battery with a Functionalized Nano Graphene Cathode," U.S. patent application Ser. No. 12/806,679 (Aug. 19, 2010).
11. C. G. Liu, et al, "Lithium Super-battery with a Functionalized Disordered Carbon Cathode," U.S. patent application Ser. No. 12/924,211 (Sep. 23, 2010).
12. Aruna Zhamu, C. G. Liu, David Neff, and Bor Z. Jang, "Surface-Controlled Lithium Ion Exchanging Energy Storage Device," U.S. patent application Ser. No. 12/928,927 (Dec. 23, 2010).
13. Aruna Zhamu, C. G. Liu, David Neff, Z. Yu, and Bor Z. Jang, "Partially and Fully Surface-Enabled Metal Ion-Exchanging Battery Device," U.S. patent application Ser. No. 12/930,294 (Jan. 3, 2011).
14. Aruna Zhamu, Chen-guang Liu, X. Q. Wang, and Bor Z. Jang, "Surface-Mediated Lithium Ion-Exchanging Energy Storage Device," U.S. patent application Ser. No. 13/199,450 (Aug. 30, 2011).
15. Aruna Zhamu, Chen-guang Liu, and Bor Z. Jang, "Partially Surface-Mediated Lithium Ion-Exchanging Cells and Method of Operating Same," U.S. patent application Ser. No. 13/199,713 (Sep. 7, 2011).
16. Bor Z. Jang, C. G. Liu, D. Neff, Z. Yu, Ming C. Wang, W. Xiong, and A. Zhamu, "Graphene Surface-Enabled Lithium Ion-Exchanging Cells: Next-Generation High-Power Energy Storage Devices," *Nano Letters*, 2011, 11 (9), pp 3785-3791.

Graphene is a common building block for most of the carbonaceous and graphitic materials, including graphite, carbon nanotube, carbon nano-fiber, graphite fiber, carbon black, activated carbon, meso-phase carbon, coke, soft carbon, and hard carbon. For instance, graphite is composed of multiple crystallites that are essentially stacks of relatively large graphene sheets (50 nm—several μm in width), while carbon black is made up of small graphene sheets or aromatic rings (lateral dimensions of 10-50 nm) connected by disordered carbon. A carbon nano-tube (CNT) is composed of one or multiple sheets of graphene rolled into a tubular shape, but the CNT and graphene are distinct in morphology, structure, and composition having vastly different properties. The CNT (one-dimensional tube) and graphene (two-dimensional sheet) are two distinct classes of materials. A carbon/graphite fiber contains flat and/or curved graphene sheets as the main constituent structural element. All of these materials can be chemically or physically unzipped or exfoliated, and then separated to obtain single-layer or multi-layer graphene sheets.

Most of the commercially available Li-ion cells make use of carbon- or graphite-based anodes, which have several significant drawbacks: low specific capacity (theoretical capacity of 372 mAh/g of graphite), slow Li intercalation (due to low solid-state diffusion coefficients of Li in graphite) resulting in a long recharge time, inability to deliver high pulse power, and necessity to use lithiated cathodes (e.g. lithium cobalt oxide), thereby limiting the choice of available cathode materials. Further, these commonly used cathodes have a relatively low specific capacity (typically <200 mAh/g) and also rely upon extremely slow Li diffusion in the solid state. These factors have contributed to the two major shortcomings of today's Li-ion batteries—a low energy density (typically 120-180 Wh/$kg_{cell}$) and low power density (<1 kW/$kg_{cell}$).

Theories set forth earlier predicted that the anode capacity limit of 372 mAh/g could be overcome provided the inter-graphene spacing in graphite can be increased from 0.335 nm to the range of 0.4-0.8 nm. Higher Li storage capacities were observed with carbon materials containing graphene sheets dispersed in a disordered carbon matrix, but these anode materials suffer from large capacity irreversibility. The possibility of storing Li at the edges of internal graphene planes or internal imperfections in the bulk of a graphite particle has been suggested, but these mechanisms in the carbon anode are also inherently irreversible. Furthermore, all of these proposed approaches to lifting the Li storage capacity limit still require storing Li in the bulk of graphite/carbon particles, which necessitates solid-state diffusion of Li during battery discharge and charge.

Our research group reported an approach to liberating graphitic and carbonaceous materials from the aforementioned constraints, leading to the discovery of an anode active material with a higher specific capacity [Ref. 1 above]. This approach entails preparing a composite composition comprising multiple solid particles, wherein (a) a solid particle is composed of graphene platelets dispersed in or bonded by a first matrix or binder material; (b) the graphene platelets have a length or width in the range of 10 nm to 10 µm; (c) the multiple solid particles are bonded by a second binder material; and (d) the first or second binder material is selected from a polymer, polymeric carbon, amorphous carbon, metal, glass, ceramic, oxide, or organic material. For a lithium ion battery anode application, the first binder or matrix material is preferably amorphous carbon or polymeric carbon. Such a composite composition provides a high anode capacity and good cycling response. For a supercapacitor electrode application, the solid particles preferably have meso-scale pores therein to accommodate electrolyte. In this report, there was no teaching about using graphene as a cathode active material.

Subsequently, several research groups [Ref. 2-5] have also used isolated graphene sheets as an anode active material, directly exposing some graphene surfaces to liquid electrolyte. An initial lithium storage capacity of typically 600-1,500 mAh/g was reported, but these graphene-based anodes suffer from large first-cycle irreversibility (up to 50%, likely due to the formation of solid-electrolyte interface, SEI) and rapid capacity decay during subsequent cycles as well.

Our research group also reported [Ref. 6-9] the use of graphene platelets as a supporting substrate for a cathode active material. Graphene platelets assist in the formation of a 3-D network of conducting paths for the cathode active material. In these reports, there was no teaching about using graphene as a cathode active material; graphene had not been recognized as a cathode active material then (and even up to this point in time). Graphene was used to improve the electrical conductivity of the cathode since all the then known cathode active materials (e.g. inorganic metal oxide and lithium iron phosphate) were electrically non-conducting.

For instance, Ref. [6] provides a mixed nano-filament composition comprising: (a) an aggregate of nanometer-scaled, electrically conductive filaments (e.g. graphene and CNT) that are substantially interconnected, intersected, or percolated to form a porous, electrically conductive filament network; and (b) Multiple nanometer-scaled, electro-active filaments comprising an electro-active material capable of absorbing and desorbing lithium ions wherein the electro-active filaments have a diameter or thickness less than 500 nm. The electro-active filaments (e.g., Si nanowires) and the electrically conductive filaments (e.g., graphene and carbon nano fibers) are mixed to form a mat-, web-, or porous paper-like structure in which at least an electro-active filament is in electrical contact with at least an electrically conductive filament. There was no teaching, implicitly or explicitly, about using graphene as a cathode active material.

Ref. [7] provides a hybrid nano-filament composition comprising (a) an aggregate of nanometer-scaled, electrically conductive filaments that are substantially interconnected, intersected, or percolated to form a porous, electrically conductive filament network, wherein the filaments have a length and a diameter or thickness with the diameter or thickness being less than 500 nm; and (b) micron- or nanometer-scaled coating that is deposited on a surface of the filaments, wherein the coating comprises a cathode active material capable of absorbing and desorbing lithium ions. It is this coating that is the cathode active material in the hybrid composition. There was no teaching, implicitly or explicitly, about using graphene as a cathode active material.

Ref. [8] provides a nanocomposite-based lithium battery electrode comprising: (a) A porous aggregate of electrically conductive nano-filaments that are substantially interconnected, intersected, physically contacted, or chemically bonded to form a three-dimensional network of electron-conducting paths; and (b) Sub-micron or nanometer-scale electro-active particles that are bonded to a surface of the nano-filaments with a conductive binder material, wherein the particles comprise an electro-active material capable of absorbing and desorbing lithium ions and wherein the electro-active material content is no less than 25% by weight based on the total weight of the particles, the binder material, and the filaments. The bonded particles are the electrode active material, not the supporting graphene sheets. There was no teaching, implicitly or explicitly, about using graphene as a cathode active material.

Ref. [9] provides a solid nanocomposite particle composition comprising: (A) an electrode active material in a form of fine particles, rods, wires, fibers, or tubes with a dimension smaller than 1 µm; (B) nano graphene platelets (NGPs); and (C) a protective matrix material reinforced by the NGPs; wherein the graphene platelets and the electrode active material are dispersed in the matrix material. Graphene was used to reinforce or improve the structural integrity of a protective carbon matrix that serves to protect an electrode active material. There was no teaching, implicitly or explicitly, about using graphene as a cathode active material.

Most recently, we proceeded to go beyond the mindset of using graphene either as an anode active material or as a cathode supporting material by investigating the feasibility of implementing graphene as a cathode active material. This is of great scientific and technological significance since the common cathode materials, such as lithium cobalt oxide and lithium iron phosphate, have relatively low specific capacities (typically <<200 mAh/g) and, hence, a strong need exists for a higher-capacity cathode. Further, a material is a good anode active material for a lithium-ion cell, the same material is usually not considered to be a viable cathode active material for a lithium-ion cell from the electrochemical potential perspective. We have defied this expectation with the discovery that graphene can be used as a high-capacity and high-power cathode material in a surface-mediated cell or SMC [Ref. 10-18].

There are two types of SMCs: partially surface-mediated cells (p-SMC, also referred to as lithium super-batteries) and fully surface-mediated cells (f-SMC). Both types of SMCs contain the following components: (a) an anode containing an anode current collector (such as copper foil) in a p-SMC, or an anode current collector plus an anode active material in an f-SMC; (b) a cathode containing a cathode current collector and a cathode active material (e.g. graphene or disordered carbon) having a high specific surface area (preferably >100 m$^2$/g); (c) a porous separator separating the anode and the cathode, soaked with an electrolyte (preferably liquid or gel electrolyte); and (d) a lithium source disposed in an anode or a cathode (or both) and in direct contact with the electrolyte.

In a fully surface-mediated cell, f-SMC, as illustrated in FIG. 2, both the cathode active material and the anode active material are porous, having large amounts of graphene surfaces in direct contact with liquid electrolyte. These electrolyte-wetted surfaces are ready to interact with nearby lithium ions dissolved therein, enabling fast and direct adsorption of lithium ions on graphene surfaces and/or redox reaction between lithium ions and surface functional groups, thereby removing the need for solid-state diffusion or intercalation. When the SMC cell is made, particles or foil of lithium metal are implemented at the anode (FIG. 2(A)), which are ionized during the first discharge cycle, supplying a large amount of lithium ions. These ions migrate to the nano-structured cathode through liquid electrolyte, entering the pores and reaching the surfaces in the interior of the cathode without having to undergo solid-state intercalation (FIG. 2(B)). When the cell is re-charged, a massive flux of lithium ions are quickly released from the large amounts of cathode surfaces, migrating into the anode zone. The large surface areas of the nano-structured anode enable concurrent and high-rate deposition of lithium ions (FIG. 2(C)), re-establishing an electrochemical potential difference between the lithium-decorated anode and the cathode.

A particularly useful nano-structured electrode material is nano graphene platelet (NGP), which refers to either a single-layer graphene sheet or multi-layer graphene pletelet. A single-layer graphene sheet is a 2-D hexagon lattice of carbon atoms covalently bonded along two plane directions. We have studied a broad array of graphene materials for electrode uses: pristine graphene, graphene oxide, chemically or thermally reduced graphene oxide, graphene fluoride, chemically modified graphene, hydrogenated graphene, nitrogenated graphene, doped graphene. In all cases, both single-layer and multi-layer graphene materials were prepared from natural graphite, petroleum or coal tar pitch-derived artificial graphite, other types of artificial graphite, etc. These micro-structures can be exfoliated to allow for easy separation or isolation of graphene sheets from one another.

These highly conducting materials, when used as a cathode active material, can have a functional group that is capable of rapidly and reversibly forming a redox reaction with lithium ions. This is one possible way of capturing and storing lithium directly on a graphene surface (including edge). This is however not a preferred or desired way of storing lithium. We have also discovered that the benzene ring centers of graphene sheets are highly effective and stable sites for capturing and storing lithium atoms, even in the absence of a lithium-capturing functional group.

In a p-SMC, the anode comprises a current collector and a lithium foil alone (as a lithium source), without an anode active material to capture and store lithium ions/atoms. Lithium has to deposit onto the front surface of an anode current collector alone (e.g. copper foil) when the battery is re-charged.

The features and advantages of SMCs that differentiate the SMC from conventional lithium-ion batteries (LIB), supercapacitors, and lithium-ion capacitors (LIC) are summarized below:

(A) In an SMC, lithium ions are exchanged between anode surfaces and cathode surfaces, not bulk or interior of an electrode active material:
  a. The conventional LIB stores lithium in the interior of an anode active material (e.g. graphite particles) in a charged state (e.g. FIG. 1(C)) and the interior of a cathode active material in a discharged state (FIG. 1(D)). During the discharge and charge cycles of a LIB, lithium ions must diffuse into and out of the bulk of a cathode active material, such as lithium cobalt oxide ($LiCoO_2$) and lithium iron phosphate ($LiFePO_4$). Lithium ions must also diffuse in and out of the inter-planar spaces in a graphite crystal serving as an anode active material. The lithium insertion or extraction procedures at both the cathode and the anode are very slow, resulting in a low power density and requiring a long re-charge time.
  b. When in a charged state, a LIC also stores lithium in the interior of graphite anode particles (FIG. 1(E)), thus requiring a long re-charge time as well. During discharge, lithium ions must also diffuse out of the interior of graphite particles, thereby compromising the power density. The lithium ions (cations $Li^+$) and their counter-ions (e.g. anions $PF_6^-$) are randomly dispersed in the liquid electrolyte when the LIC is in a discharged state (FIG. 1(F)). In contrast, the lithium ions are captured by graphene surfaces (e.g. at centers of benzene rings of a graphene sheet as illustrated in FIG. 2(D)) when an SMC is in a discharged state. Lithium is deposited on the surface of an anode (anode current collector and/or anode active material) when the SMC is in a charged state. Relatively few lithium ions stay in the liquid electrolyte.
  c. When in a charged state, a symmetric supercapacitor (EDLC) stores their cations near a surface (but not at the surface) of an anode active material (e.g. activated carbon, AC) and stores their counter-ions near a surface (but not at the surface) of a cathode active material (e.g., AC), as illustrated in FIG. 1(A). When the EDLC is discharged, both the cations and their counter-ions are re-dispersed randomly in the liquid electrolyte, further away from the AC surfaces (FIG. 1(B)). In other words, neither the cations nor the anions are exchanged between the anode surface and the cathode surface.
  d. For a supercapacitor exhibiting a pseudo-capacitance or redox effect, either the cation or the anion form a redox pair with an electrode active material (e.g. polyaniline or manganese oxide coated on AC surfaces) when the supercapacitor is in a charged state. However, when the supercapacitor is discharged, both the cations and their counter-ions are re-dispersed randomly in the liquid electrolyte, away from the AC surfaces. Neither the cations nor the anions are exchanged between the anode surface and the cathode surface. In contrast, in a SMC, the cations ($Li^+$) are captured by cathode surfaces (e.g. graphene benzene ring centers) when the SMC is in the discharged state. It is also the cations ($Li^+$) that are captured by surfaces of an anode current collector and/or anode active material) when the SMC is in the discharged state. In other words, the lithium ions are shuttled between the anode surfaces and the cathode surfaces.
  e. An SMC operates on the exchange of lithium ions between the surfaces of an anode (anode current collector and/or anode active material) and a cathode (cathode active material). The cathode in a SMC has (a) benzene ring centers on a graphene plane to capture and release lithium; (b) functional groups (e.g. attached at the edge or basal plane surfaces of a graphene sheet) that readily and reversibly form a redox reaction with a lithium ion from a lithium-containing electrolyte; and (c) surface defects to trap and release lithium during discharge and charge.

Unless the cathode active material (e.g. graphene, CNT, or disordered carbon) is heavily functionalized, mechanism (b) does not significantly contribute to the lithium storage capacity.

When the SMC is discharged, lithium ions are released from the surfaces of an anode (surfaces of an anode current collector and/or surfaces of an anode active material, such as graphene). These lithium ions do not get randomly dispersed in the electrolyte. Instead, these lithium ions swim through liquid electrolyte and get captured by the surfaces of a cathode active material. These lithium ions are stored at the benzene ring centers, trapped at surface defects, or captured by surface/edge-borne functional groups. Very few lithium ions remain in the liquid electrolyte phase.

When the SMC is re-charged, massive lithium ions are released from the surfaces of a cathode active material having a high specific surface area. Under the influence of an electric field generated by an outside battery charger, lithium ions are driven to swim through liquid electrolyte and get captured by anode surfaces, or are simply electrochemically plated onto anode surfaces.

(B) In a discharged state of a SMC, a great amount of lithium atoms are captured on the massive surfaces of a cathode active material. These lithium ions in a discharged SMC are not dispersed or dissolved in the liquid electrolyte, and are not part of the electrolyte. Therefore, the solubility limit of lithium ions and/or their counter-ions does not become a limiting factor for the amount of lithium that can be captured at the cathode side. It is the specific surface area at the cathode that dictates the lithium storage capacity of an SMC provided there is a correspondingly large amount of available lithium atoms at the lithium source prior to the first discharge/charge.

(C) During the discharge of an SMC, lithium ions coming from the anode side through a separator only have to diffuse in the liquid electrolyte residing in the cathode to reach a surface/edge of a graphene plane. These lithium ions do not need to diffuse into or out of the volume (interior) of a solid particle. Since no diffusion-limited intercalation is involved at the cathode, this process is fast and can occur in seconds. Hence, this is a totally new class of energy storage device that exhibits unparalleled and unprecedented combined performance of an exceptional power density, high energy density, long and stable cycle life, and wide operating temperature range. This device has exceeded the best of both battery and supercapacitor worlds.

(D) In an f-SMC, the energy storage device operates on lithium ion exchange between the cathode and the anode. Both the cathode and the anode (not just the cathode) have a lithium-capturing or lithium-storing surface and both electrodes (not just the cathode) obviate the need to engage in solid-state diffusion. Both the anode and the cathode have large amounts of surface areas to allow lithium ions to deposit thereon simultaneously, enabling dramatically higher charge and discharge rates and higher power densities.

The uniform dispersion of these surfaces of a nano-structured material (e.g. graphene, CNT, disordered carbon, nano-wire, and nano-fiber) at the anode also provides a more uniform electric field in the electrode in which lithium can more uniformly deposit without forming a dendrite. Such a nano-structure eliminates the potential formation of dendrites, which was the most serious problem in conventional lithium metal batteries (commonly used in 1980s and early 1990s before being replaced by lithium-ion batteries).

(E) A SMC typically has an open-circuit voltage of >1.0 volts (most typically >1.5 volts) and can operate up to 4.5 volts for lithium salt-based organic electrolyte. Using an identical electrolyte, a corresponding EDLC or symmetric supercapacitor has an open-circuit voltage of essentially 0 volts and can only operate up to 2.7 volts. Also using an identical electrolyte, a LIC operates between 2.2 volts and 3.8 volts. These are additional manifestations of the notion that the SMC is fundamentally different and patently distinct from both an EDLC and a LIC.

The amount of lithium stored in the lithium source when a SMC is made dictates the amount of lithium ions that can be exchanged between an anode and a cathode. This, in turn, dictates the energy density of the SMC.

In these co-pending patent applications [Ref. 10-15] we used graphene as a cathode active material for a SMC cell, wherein the anode contains only a current collector or a current collector and an anode active material having high surfaces on which lithium can be electrochemically deposited. The anode active material (e.g. graphene or activated carbon) in a SMC does not involve lithium intercalation and de-intercalation. In the instant application, graphene is used as a cathode active material for a lithium-ion cell that contains a high-capacity anode active material (e.g. Si, Sn, or $SnO_2$) and/or a high-rate capable anode active material (e.g. nano-scaled $Mn_3O_4$ particles). These anode active materials (e.g. Si, Sn, $SnO_2$, $Mn_3O_4$, and lithium titanate) in the presently invented lithium-ion cell operate on lithium intercalation and de-intercalation. These combinations lead to several unexpected yet highly significant results. Experimental evidence indicates that the electrochemical behaviors of these Li-ion cells and the SMC cells are vastly different and fundamentally distinct.

SUMMARY OF THE INVENTION

The present invention provides a lithium-ion cell comprising: (a) a positive electrode (cathode) comprising a graphene cathode active material having a surface area to capture and store lithium thereon and wherein the graphene cathode is meso-porous having a specific surface area greater than 100 $m^2/g$ (preferably greater than 500 $m^2/g$, more preferably greater than 1,000 $m^2/g$, and most preferably greater than 1,500 $m^2/g$); (b) a negative electrode (anode) comprising an anode active material for inserting and extracting lithium during a charge and discharge of the cell, wherein the anode active material is mixed with a conductive additive and a resin binder to form a porous electrode structure, or coated onto a current collector in a coating or thin film form (e.g. <300 μm, preferably <200 μm); (c) a porous separator disposed between the anode and the cathode; (d) a lithium-containing electrolyte in physical contact with the two electrodes; and (e) a lithium source disposed in at least one of the two electrodes when the cell is made.

The graphene cathode active material may be selected from a single-layer sheet or multi-layer platelet of graphene, graphene oxide, graphene fluoride, hydrogenated graphene, nitrogenated graphene, boron-doped graphene, nitrogen-doped graphene, functionalized graphene, reduced graphene oxide, or a combination thereof. In a preferred embodiment, the graphene cathode active material is pristine graphene containing no oxygen. This is not just due to the significantly higher electric conductivity of pristine graphene, but its surprisingly great ability to capture and store lithium on its surface. The cathode active material preferably contains single-layer graphene sheets.

In a highly desired embodiment, the cathode contains a conductive additive and/or a resin binder and the cathode forms a meso-porous structure having a pore size in the range of 2 nm and 50 nm. In particular, the cathode contains a conductive filler selected from graphite or carbon particles, carbon black, expanded graphite, carbon nanotube, carbon nano-fiber, carbon fiber, conductive polymer, or a combination thereof. The materials in this list are commonly used as a conductive additive, not a cathode active material, in lithium-ion batteries. The cathode does not contain any cathode active material other than the graphene material; no lithium transition metal oxide, no transition metal phosphate, etc. The cathode is not a sulfur cathode either; the sulfur cathode relies on very slow and often irreversible chemical reactions between Li and S and there are several intermediate $Li_xS$ compounds that can get dissolved in electrolyte. The lithium-ion cell does not contain a Li—S cell or Li-air cell. Graphene is the only cathode active material used in the presently invented Li-ion cell.

The lithium source comprises a lithium chip, lithium alloy chip, lithium foil (FIG. 3(A)), lithium alloy foil, lithium powder (FIG. 3(B)), lithium alloy powder, surface stabilized lithium particles, a mixture of lithium metal or lithium alloy with a lithium intercalation compound, lithium or lithium alloy film coated on a surface of an anode or cathode active material, or a combination thereof. The anode active material, in both FIG. 3(A) and FIG. 3(B), can be a prelithiated material or a non-lithiated material. Although not shown, a resin binder and a conductive additive are preferably used to bind the anode active material together to form an electrode of structural integrity and to help maintain an electric contact between the anode and the anode current collector. The lithium source (e.g., lithium powder) is normally not adhered to the current collector with a resin binder.

In a preferred embodiment of the present invention, the anode active material is a non-prelithiated material. Preferably, the anode active material contains a mixture of a high capacity anode material and a high rate capable anode material, wherein the high rate capable anode material is selected from nano-scaled particles or filaments of a transition metal oxide, $Co_3O_4$, $Mn_3O_4$, $Fe_3O_4$, or a combination thereof, and the high capacity anode material is selected from Si, Ge, Sn, SnO, or a combination thereof. Nano-scaled particles or filaments have a dimension (e.g. diameter or thickness) less than 100 nm, enabling a short lithium diffusion time and high power density. In particular, the anode active material is a non-prelithiated material selected from the group consisting of: (a) Non-lithiated silicon (Si), germanium (Ge), tin (Sn), lead (Pb), antimony (Sb), bismuth (Bi), zinc (Zn), aluminum (Al), titanium (Ti), cobalt (Co), nickel (Ni), manganese (Mn), cadmium (Cd), and mixtures thereof; (b) Non-lithiated alloys or intermetallic compounds of Si, Ge, Sn, Pb, Sb, Bi, Zn, Al, Ti, Co, Ni, Mn, Cd, and their mixtures; (c) Non-lithiated oxides, carbides, nitrides, sulfides, phosphides, selenides, tellurides, or antimonides of Si, Ge, Sn, Pb, Sb, Bi, Zn, Al, Fe, Ti, Co, Ni, Mn, Cd, and mixtures or composites thereof; (d) Non-lithiated salts or hydroxides of Sn; and (e) graphite or carbon material in a powder or fibrous form. A non-prelithiated anode active material is sufficient since there is a separate lithium source incorporated in this lithium-ion cell.

In a preferred embodiment, the aforementioned non-lithiated anode active material is in the form of a nano particle, nano disc, nano platelete, nano wire, nano-rod, nano belt, nano scroll, nano tube, nano filament, nano coating, or nano film.

Another preferred embodiment of the present invention is a lithium-ion cell comprising: (A) a positive electrode (cathode) comprising a graphene cathode active material having a surface area to capture and store lithium thereon and wherein the graphene cathode is meso-porous having a specific surface area greater than 100 $m^2/g$; (B) A negative electrode (anode) comprising a prelithiated anode active material for inserting and extracting lithium during a charge and discharge of the cell, wherein the anode active material is a nano particle, nano disc, nano platelete, nano wire, nano-rod, nano belt, nano scroll, nano tube, nano filament, nano coating, or nano film selected from: (a) a pre-lithiated silicon (Si), germanium (Ge), tin (Sn), lead (Pb), antimony (Sb), bismuth (Bi), zinc (Zn), aluminum (Al), titanium (Ti), cobalt (Co), nickel (Ni), manganese (Mn), cadmium (Cd), or a mixture thereof; (b) a pre-lithiated alloy or intermetallic compound of Si, Ge, Sn, Pb, Sb, Bi, Zn, Al, Ti, Co, Ni, Mn, Cd, or a mixture thereof; (c) a pre-lithiated oxide, carbide, nitride, sulfide, phosphide, selenide, telluride, or antimonide of Si, Ge, Sn, Pb, Sb, Bi, Zn, Al, Fe, Ti, Co, Ni, Mn, Cd, or a mixture or composite thereof, or (d) a pre-lithiated salt or hydroxide of Sn; and wherein said anode active material is electrically connected directly to an anode current collector or is connected to an anode current collector through a binder and/or a conductive additive; (C) a porous separator disposed between the anode and the cathode; and (D) a lithium-containing electrolyte in physical contact with the anode and the cathode. Since a prelithiated anode active material is implemented, an additional lithium source is not needed.

It may be noted that, in some of our SMC cells disclosed recently [e.g. Ref. 12, 14, 15], a prelithiated compound was suggested as a possible lithium source, but this compound was not used as an anode active material. This prelithiated compound (e.g. shown in FIG. 2(A)) in a SMC was dispersed near either electrode to emit lithium ions into electrolyte so that these released lithium ions could be shuttled between anode surfaces and cathode surfaces. This lithiated compound was not electrically connected to an anode current collector (directly or through a resin binder and/or a conductive additive) after the first discharge cycle. This lithiated compound was not glued together with a resin to form an electrode of structural integrity; but, instead, was simply dispersed near the anode for supplying lithium during the first cycle. Further, this lithiated compound was not a nano particle, nano disc, nano platelete, nano wire, nano-rod, nano belt, nano scroll, nano tube, nano filament, nano coating, or nano film as herein specified.

In a further preferred embodiment, the anode active material contains a mixture of a high capacity anode material and a high rate capable anode material, wherein the high rate capable anode material is selected from nano-scaled particles or filaments of a lithium transition metal oxide, $Co_3O_4$, $Mn_3O_4$, $Fe_3O_4$, $Li_4Ti_5O_{12}$, or a combination thereof, and the high capacity anode material is selected from pre-lithiated Si, Ge, Sn, SnO, or a combination thereof.

Preferably, the anode active material is prelithiated to an initial specific capacity of no less than 500 mAh/g (more preferably no less than 700 mAh/g, even more preferably no less than 1,000 mAh/g, further preferably no less than 1,500 mAh/g, and most preferably no less than 2,000 mAh/g) based on the anode active material weight. Preferably, when the lithium-ion cell containing such a prelithiated anode active material is discharged, the anode active material is not fully discharged; instead, the anode active material maintains at least 50% of the initial specific capacity.

Yet another preferred embodiment of the present invention is a lithium-ion cell comprising: (A) A positive electrode (cathode) comprising a graphene cathode active material having a surface area to capture and store lithium thereon and wherein said graphene cathode is meso-porous having a specific surface area greater than 100 $m^2/g$; (B) A negative electrode (anode) comprising an anode active material for inserting and extracting lithium during a charge and discharge of the cell, wherein the anode active material is mixed with a conductive filler and a binder to form a porous electrode and the anode active material is selected from: (a) a pre-lithiated silicon (Si), germanium (Ge), tin (Sn), lead (Pb), antimony (Sb), bismuth (Bi), zinc (Zn), aluminum (Al), titanium (Ti), cobalt (Co), nickel (Ni), manganese (Mn), cadmium (Cd), or a mixture thereof; (b) a pre-lithiated alloy or intermetallic compound of Si, Ge, Sn, Pb, Sb, Bi, Zn, Al, Ti, Co, Ni, Mn, Cd, or a mixture thereof; (c) a pre-lithiated oxide, carbide, nitride, sulfide, phosphide, selenide, telluride, or antimonide of Si, Ge, Sn, Pb, Sb, Bi, Zn, Al, Fe, Ti, Co, Ni, Mn, Cd, or a mixture or composite thereof, or (d) a pre-lithiated salt or hydroxide of Sn; (C) a porous separator disposed between the anode and the cathode; and (D) a lithium-containing electrolyte in physical contact with the two electrodes. This lithium-ion cell preferably further contains a lithium source disposed in at least one of the two electrodes when the cell is made, wherein the lithium source comprises a lithium chip, lithium alloy chip, lithium foil, lithium alloy foil, lithium powder, lithium alloy powder, surface stabilized lithium particles, a mixture of lithium metal or lithium alloy with a lithium intercalation compound, lithium or lithium alloy film coated on a surface of an anode or cathode active material, or a combination thereof.

The lithium-ion cell of the present invention may advantageously further comprise an anode current collector and/or a cathode current collector that is a porous, electrically conductive material selected from metal foam, metal web or screen, perforated metal sheet, metal fiber mat, metal nanowire mat, porous conductive polymer film, conductive polymer nano-fiber mat or paper, conductive polymer foam, carbon foam, carbon aerogel, carbon xerox gel, graphene foam, graphene oxide foam, reduced graphene oxide foam, carbon fiber paper, graphene paper, graphene oxide paper, reduced graphene oxide paper, carbon nano-fiber paper, carbon nano-tube paper, or a combination thereof.

In one embodiment, the lithium-ion cell may have a discharge operation that involves both lithium intercalation into an interior of the cathode active material (if a multilayer graphene platelet is present) and lithium capturing on graphene surfaces of the cathode active material.

The electrolyte is preferably organic liquid electrolyte, ionic liquid electrolyte, or gel electrolyte containing a first amount of lithium ions when the cell is made. The electrolyte preferably comprises lithium salt-containing liquid electrolyte (e.g. organic liquid or ionic liquid) or gel electrolyte in which lithium ions have a high diffusion coefficient. Solid electrolyte is normally not desirable, but some thin layer of solid electrolyte may be used if it exhibits a relatively high diffusion rate. Lithium-containing ionic liquids are particularly desired due to their low volatility and non-flammability (hence, low or no fire or explosion hazard).

The lithium source may be preferably in a form of solid lithium or lithium alloy foil, lithium or lithium alloy chip, lithium or lithium alloy powder, or surface-stabilized lithium particles. The lithium source may be a layer of lithium or lithium alloy thin film pre-loaded on surfaces of an anode active material. In one preferred embodiment, the cell operates between a lower voltage limit and an upper voltage limit wherein the lithium source provides an amount of lithium sufficient for the anode to retain a non-zero lithium content when the cell is discharged to the lower voltage limit.

To illustrate the operational principle of this new ultra high-capacity battery (FIG. 4(A)), one may consider a case wherein a lithium source (e.g. small pieces of lithium foil) is implemented between a nano-structured anode (e.g. comprising nano Si particles and conductive additives bonded together by a resin) and a porous polymer separator when the battery device is made, and wherein a nano-structured cathode comprises a graphene material having massive surface areas capable of capturing and storing lithium thereon. The graphene cathode contains pores that are preferably meso-scaled (2 nm-50 nm), but can be smaller than 2 nm. Referring to FIG. 4(A)-(C), during the first discharge cycle, lithium foil is ionized to generate lithium ions in the liquid electrolyte. Lithium ions rapidly migrate through the pores of the polymer separator into the cathode side. Since the cathode is also meso-porous having interconnected pores to accommodate liquid electrolyte therein, lithium ions basically just have to sail through liquid to reach an active site on a surface or edge of a graphene sheet or platelet at the cathode. The graphene surface is in direct contact with electrolyte and readily accepts lithium ions from the electrolyte. Because all the steps (lithium ionization, liquid phase diffusion, and surface trapping/capturing) are fast and no solid-state diffusion is required, the whole process is very fast, enabling fast discharging of the cell and a high power density.

In the above example, the discharge process continues until either the lithium foil is completely ionized or all the active sites on the cathode active materials are occupied by lithium atoms. During re-charge, lithium ions are released from the massive surfaces of the cathode active material, diffuse through liquid electrolyte, and intercalate into the bulk of an anode active material (e.g. Si particles). This intercalation step involves solid-state diffusion and hence, can be very slow, as compared to the SMC cells invented earlier by us. However, we have found that the solid-state diffusion time can be significantly reduced if the anode active material is made into a nano-scaled structure; e.g. in the form of a nano particle, nano disc, nano platelete, nano wire, nano-rod, nano belt, nano scroll, nano tube, nano filament, nano coating, or nano film.

The surfaces of a graphene cathode material are capable of capturing lithium ions directly from a liquid electrolyte phase and storing lithium atoms on the surfaces in a reversible and stable manner. This is a completely new electrochemistry that has never been discovered by anybody other than our research group. All other research groups have put graphene to use as an anode active material in a lithium ion cell.

During the discharge process, lithium ions are released from the anode and the graphene surfaces at the cathode continue to remove lithium ions from the liquid electrolyte and store lithium on graphene surfaces, maintaining a low lithium ion content in the liquid electrolyte, lower or equal to the lithium ion solubility limit in the liquid. This process continues until graphene surfaces at the cathode are saturated with lithium. This saturation limit can be many times greater than the lithium ion solubility limit in the liquid electrolyte provided the specific surface area of the cathode active material is sufficiently high (e.g. higher than 100 $m^2/g$). Such a high lithium amount on cathode surfaces implies a high energy density.

The cathode active material has a high specific surface area (>100 $m^2/g$) that is in direct contact with the electrolyte (e.g. being directly immersed in electrolyte) and capable of capturing lithium ions from the electrolyte and storing the lithium atoms in the surface active sites (benzene ring or carbon hexagon centers and surface defect sites). Preferably, the cathode as an electrode forms a meso-porous structure having a pore size in the range of 2 nm and 50 nm. Preferably, the cathode has a specific surface area no less than 500 $m^2$/gram (preferably >1,000 $m^2$/gram, and more preferably >1,500 $m^2$/gram) to store or support lithium ions or atoms thereon.

The presently invented cell is a new breed of lithium-ion cell further in terms of the operating voltage range. Our new cell typically operates in a voltage range of from 1.0 volt to 4.5 volts, but can be prescribed to operate in a range between a lower voltage limit (LVL) and an upper voltage limit (UVL, from 3.8 to 4.5 volts). The LVL is preferably between 0.5 volts and 2.0 volts, but more preferably between 0.8 volts and 1.5 volts. The LVL is preferably lower than the open-circuit voltage (OCV) of the cell that is measured when the cell is made. The OCV of the new lithium-ion cell can be greater than 2.0 volts.

DESCRIPTION OF THE PREFERRED EMBODIMENTS

The present invention may be more readily understood by reference to the following detailed description of the invention taken in connection with the accompanying drawing figures, which form a part of this disclosure. It is to be understood that this invention is not limited to the specific devices, methods, conditions or parameters described and/or shown herein, and that the terminology used herein is for the purpose of describing particular embodiments by way of example only and is not intended to be limiting the claimed invention.

This invention provides a new and distinct type of lithium-ion cell, which exhibits the highest energy density of all rechargeable lithium-ion batteries ever reported in battery industry.

This cell contains a graphene-based positive electrode (cathode) containing massive graphene surfaces for capturing and storing lithium atoms thereon. The cathode, as an electrode, is preferably nano-structured with meso-scaled pores (2-50 nm, preferably 2-10 nm) and great amounts of surface areas (preferably >100 $m^2/g$, more preferably >500 $m^2/g$, further more preferably >1,000 $m^2/g$, and most preferably >1,500 $m^2/g$) in physical contact with electrolyte. The cell also contains a negative electrode (anode) comprising an anode active material for inserting and extracting lithium during a charge and discharge of the cell, wherein the anode active material is mixed with a conductive additive and/or a resin binder to form a porous electrode structure, or coated onto a current collector in a coating or thin film form (e.g. film thickness <100 μm). The cell further contains a porous separator disposed between the anode and the cathode; a lithium-containing electrolyte in physical contact with the two electrodes; and a lithium source disposed in at least one of the two electrodes when the cell is made. The anode active material is not pre-lithiated and is lithium-free when the cell is made.

Figure 3:
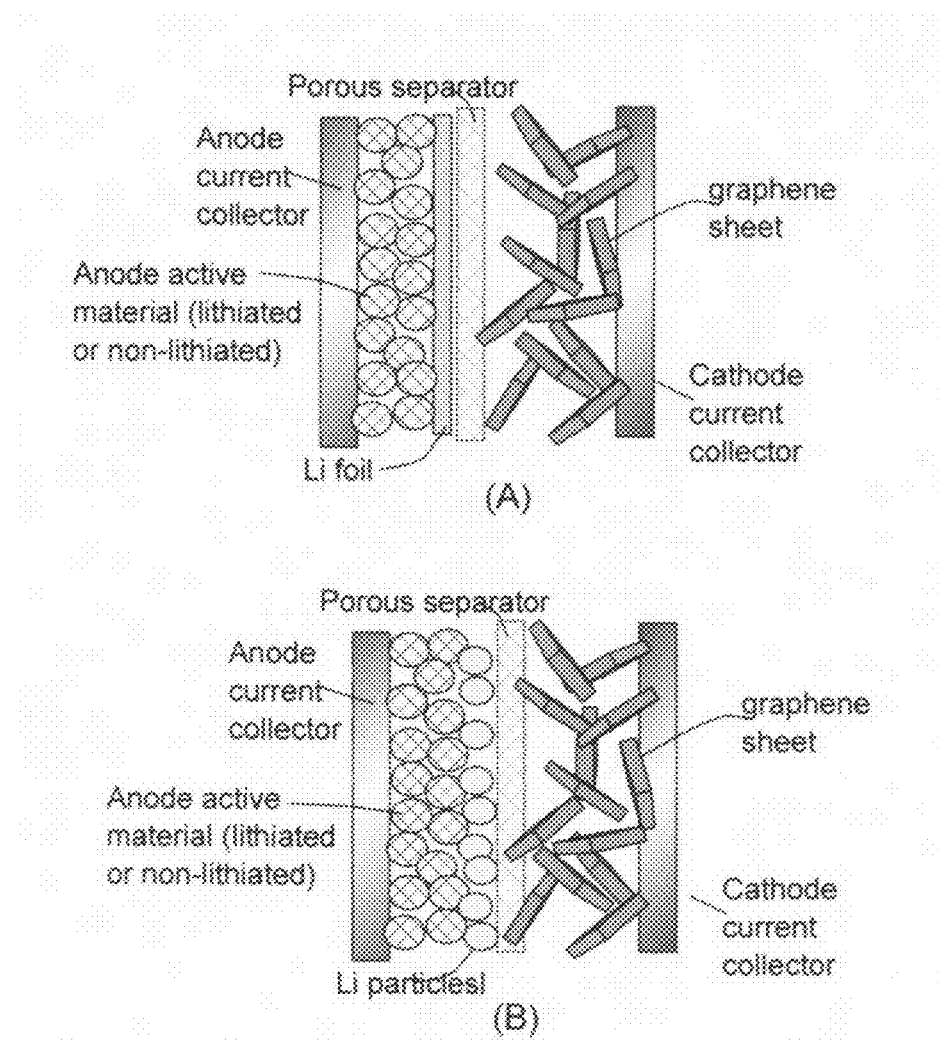
FIG. 3 (A) a graphene cathode-based lithium-ion cell according to one embodiment of the instant invention; (b) a graphene cathode-based lithium-ion cell according to another embodiment of the instant invention.
Figure 4:
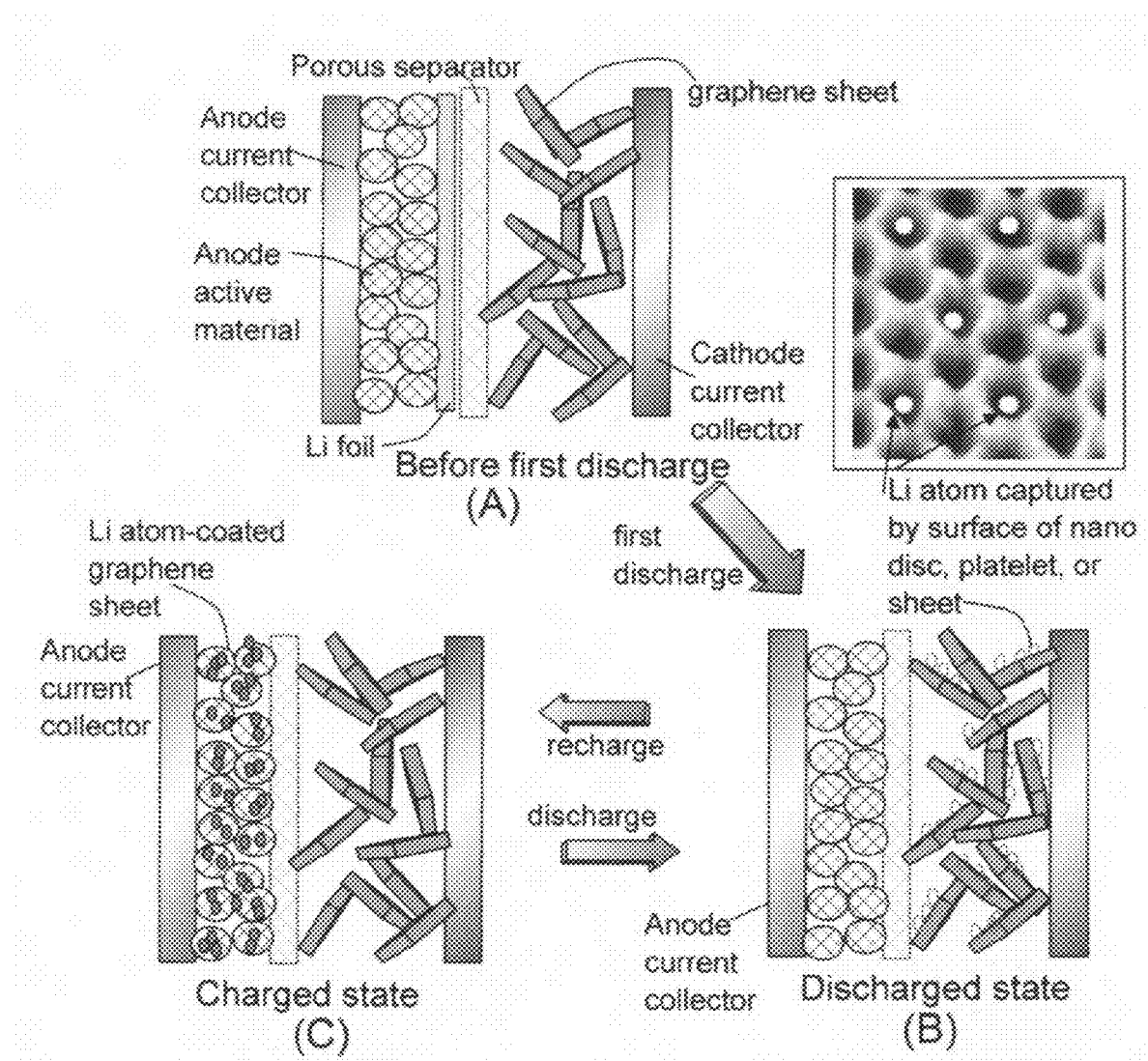
FIG. 4 (A) The structure of a graphene cathode-based lithium-ion cell when it is made (prior to the first discharge or charge cycle); (B) The structure of this cell after its first discharge operation (lithium is ionized with the lithium ions diffusing through liquid electrolyte to reach the surfaces of cathode graphene sheets and get rapidly captured by these surfaces); (C) The structure of this battery device after being re-charged (lithium ions are released from the cathode graphene surfaces, diffusing through liquid electrolyte to reach the anode and intercalate into the interior of anode active material.

Several types of lithium sources may be implemented to provide the lithium ions that are needed for shuttling between the anode and the cathode. Examples of the sources are a lithium chip, lithium alloy chip, lithium foil (FIGS. 3A and 4A), lithium alloy foil, lithium powder (FIG. 3B), lithium alloy powder, surface stabilized lithium particles, a mixture of lithium metal or lithium alloy with a lithium intercalation compound, lithium or lithium alloy film coated on a surface of an anode or cathode active material, or a combination thereof.

In this preferred embodiment of the present invention, the anode active material is not prelithiated since there is a lithium source already. In particular, the anode active material is a non-prelithiated material selected from the group consisting of: (a) Non-lithiated silicon (Si), germanium (Ge), tin (Sn), lead (Pb), antimony (Sb), bismuth (Bi), zinc (Zn), aluminum (Al), titanium (Ti), cobalt (Co), nickel (Ni), manganese (Mn), cadmium (Cd), and mixtures thereof; (b) Non-lithiated alloys or intermetallic compounds of Si, Ge, Sn, Pb, Sb, Bi, Zn, Al, Ti, Co, Ni, Mn, Cd, and their mixtures; (c) Non-lithiated oxides, carbides, nitrides, sulfides, phosphides, selenides, tellurides, or antimonides of Si, Ge, Sn, Pb, Sb, Bi, Zn, Al, Fe, Ti, Co, Ni, Mn, Cd, and mixtures or composites thereof; (d) Non-lithiated salts or hydroxides of Sn; and (e) graphite or carbon material in a powder or fibrous form. Unless the anode active material is directly coated onto a current collector, the anode active material is typically mixed with a conductive additive and/or a resin binder to form a porous electrode structure that is electrically connected to the anode current collector.

During the first discharge cycle of the cell after it is made, the lithium source releases lithium ions into the electrolyte. These lithium ions migrate through the porous separator into the cathode and get captured by the cathode graphene surfaces. During the subsequent re-charge of the cell, lithium ions are released from cathode graphene surfaces and migrate back to the anode side. These lithium ions then intercalate into the interior of anode active material particles or coating. The subsequent discharge cycle involves releasing lithium ions from the anode active material through de-intercalation. In a preferred embodiment, the aforementioned non-lithiated anode active material is in the form of a nano particle, nano disc, nano platelete, nano wire, nano-rod, nano belt, nano scroll, nano tube, nano filament, nano coating, or nano film.

Preferably, the anode active material contains a mixture of a high capacity anode material and a high rate capable anode material, wherein the high rate capable anode material is selected from nano-scaled particles or filaments of a transition metal oxide, $Co_3O_4$, $Mn_3O_4$, $Fe_3O_4$, or a combination thereof, and the high capacity anode material is selected from Si, Ge, Sn, SnO, or a combination thereof. Nano-scaled particles or filaments have a dimension (e.g. diameter or thickness) less than 100 nm, enabling a short lithium diffusion time and high power density.

The graphene cathode active material may be selected from a single-layer sheet or multi-layer platelet of graphene, graphene oxide, graphene fluoride, hydrogenated graphene, nitrogenated graphene, boron-doped graphene, nitrogen-doped graphene, functionalized graphene, reduced graphene oxide, or a combination thereof. In a preferred embodiment, the graphene cathode active material is pristine graphene containing no oxygen. Pristine graphene is particularly desirable due to not only the significantly higher electric conductivity of pristine graphene, but also its surprisingly great ability to capture and store lithium on its surface. The cathode active material preferably contains single-layer graphene sheets, which have highest specific surface areas.

It has been commonly believed that a high specific surface area is an undesirable feature of either an anode or a cathode for a lithium-ion cell based on the belief that a higher surface area leads to the formation of more solid-electrolyte interface (SEI), a common cause of capacity irreversibility or capacity loss. We have herein defied this expectation and discovered that the graphene-based cathode materials can be superior cathode materials for lithium-ion cells, which could operate thousands of cycles without any significant capacity decay. This is so in spite of or despite of the notion that both graphite (where graphene is produced from) and isolated graphene sheets, when used as an anode active material, have serious SEI issue.

Even more surprisingly, the cathode graphene materials, when incorporated as a cathode active material and when the specific surface area of the resulting cathode exceeds 100 $m^2/g$, exhibit a specific capacity significantly higher than that of any commonly used lithium ion cell cathode. For instance, the micron-sized layered $CoO_2$ used in a lithium-ion battery exhibits a specific capacity typically lower than 160 mAh/g. The highest-capacity cathode active material for the lithium-ion cell is likely vanadium oxide that has a theoretical specific capacity of approximately 430 mAh/g. In contrast, we have routinely achieved a cathode specific capacity of 1100-2,100 mAh/g when graphene is used as a cathode active material in a lithium-ion cell. It is of interest to note that graphene, when used as an SMC cathode, has not achieved a specific capacity above 500 mAh/g up to this point of time. These observations are well beyond the expectation of skilled artisans in the field of electrochemistry.

In an embodiment of the present invention, one may choose to add a conductive additive and/or a binder material (e.g. binder resin or carbonized resin) to form an electrode of structural integrity. A conductive additive is generally needed since many of the non-carbon or non-graphite based anode active materials are inorganic materials (e.g., Si, SnO, and $Mn_3O_4$) that are not electrically conducting. The conductive additive or filler may be selected from any electrically conductive material, but is advantageously selected from graphite or carbon particles, carbon black, expanded graphite, graphene, carbon nanotube, carbon nano-fiber, carbon fiber, conductive polymer, or a combination thereof. The amount of conductive fillers is preferably no greater than 30% by weight based on the total cathode electrode weight (without counting the cathode current collector weight), preferably no greater than 15% by weight, and most preferably no greater than 10% by weight. The amount of binder material is preferably no greater than 15% by weight, more preferably no greater than 10%, and most preferably no greater than 5% by weight.

Preferred electrolyte types include liquid electrolyte, gel electrolyte, polymer electrolyte, solid electrolyte, and ionic liquid electrolyte (preferably containing lithium salts dissolved therein), or a combination thereof.

Although there is no limitation on the electrode thickness, the presently invented positive electrode preferably has a thickness greater than 100 μm, more preferably greater than 150 μm, and most preferably greater than 200 μm.

Another preferred embodiment of the present invention is a lithium-ion cell comprising: (A) a cathode comprising a graphene cathode active material having a surface area to capture and store lithium thereon and wherein the graphene cathode is meso-porous having a specific surface area greater than 100 m$^2$/g; (B) An anode comprising a prelithiated anode active material for inserting and extracting lithium during a charge and discharge of the cell, wherein the anode active material is a nano particle, nano disc, nano platelete, nano wire, nano-rod, nano belt, nano scroll, nano tube, nano filament, nano coating, or nano film selected from: (a) a pre-lithiated silicon (Si), germanium (Ge), tin (Sn), lead (Pb), antimony (Sb), bismuth (Bi), zinc (Zn), aluminum (Al), titanium (Ti), cobalt (Co), nickel (Ni), manganese (Mn), cadmium (Cd), or a mixture thereof; (b) a pre-lithiated alloy or intermetallic compound of Si, Ge, Sn, Pb, Sb, Bi, Zn, Al, Ti, Co, Ni, Mn, Cd, or a mixture thereof; (c) a pre-lithiated oxide, carbide, nitride, sulfide, phosphide, selenide, telluride, or antimonide of Si, Ge, Sn, Pb, Sb, Bi, Zn, Al, Fe, Ti, Co, Ni, Mn, Cd, or a mixture or composite thereof, (d) a pre-lithiated salt or hydroxide of Sn; or (e) a pre-lithiated carbon or graphite material, and wherein said anode active material is electrically connected directly to an anode current collector or is connected to an anode current collector through a binder and/or a conductive additive; (C) a porous separator disposed between the anode and the cathode; and (D) a lithium-containing electrolyte in physical contact with the anode and the cathode. Since a prelithiated anode active material is implemented, an additional lithium source is not needed.

Figure 1A:
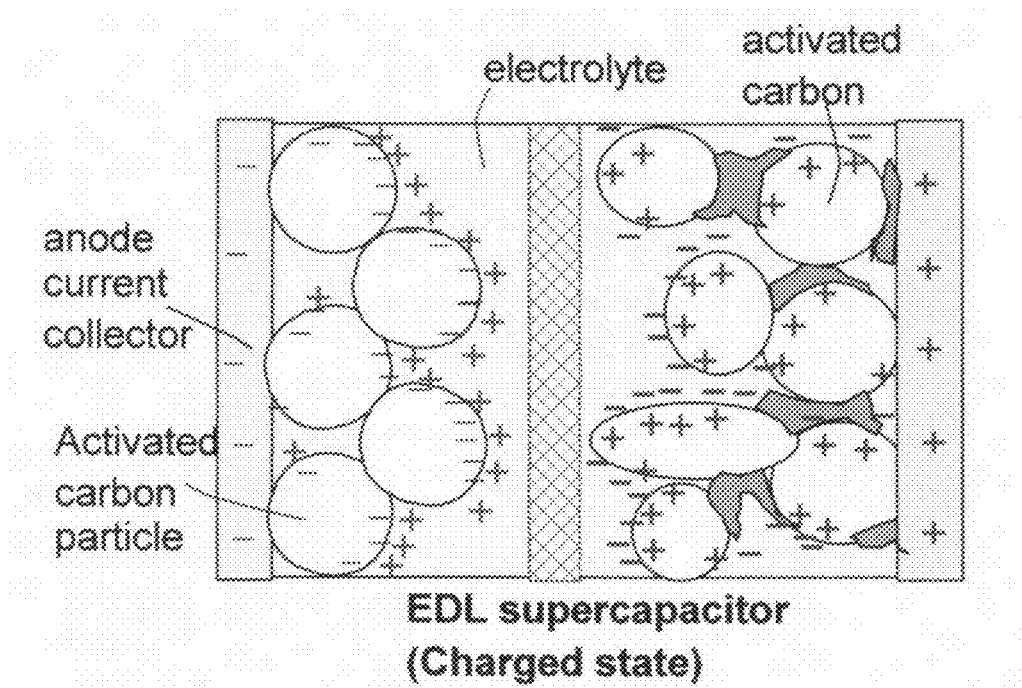
FIG. 1 (A) a prior art electric double-layer (EDL) super-capacitor in the charged state; (B) the same EDL supercapacitor in the discharged state; (C) a prior art lithium-ion battery (LIB) cell in the charged state; (D) the same LIB in the discharged state; (E) a prior art lithium-ion capacitor (LIC) cell in the charged state, using graphite particles as the anode active material and activated carbon (AC) as the cathode active material; (F) the same LIC in the discharged state; (G) another prior art LIC using lithium titanate as the anode active material and AC as the cathode active material.
Figure 1B:
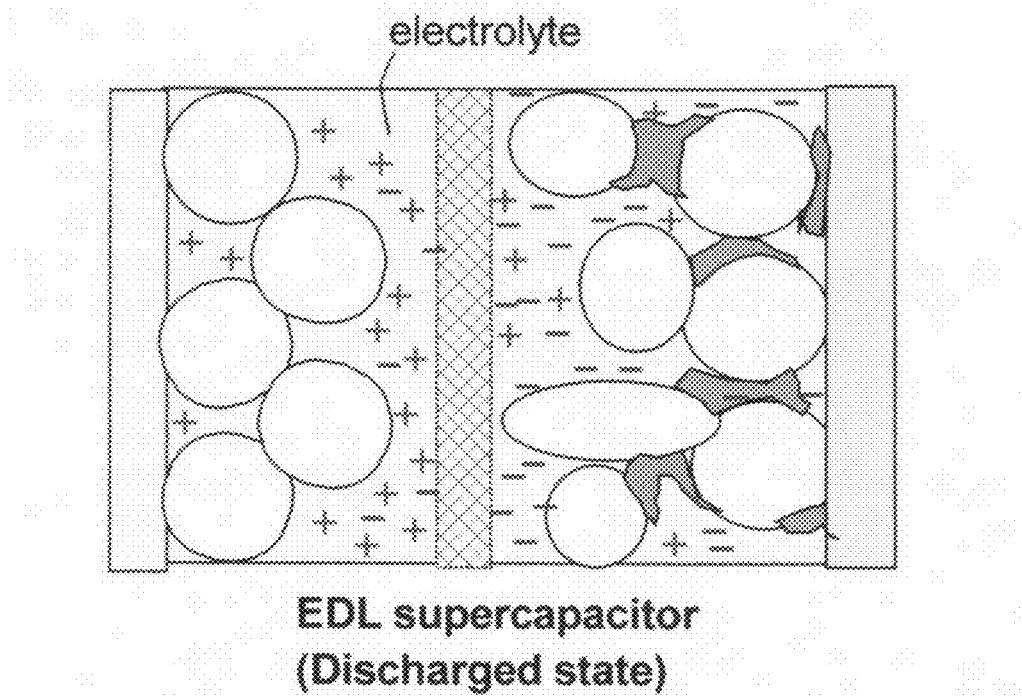
Figure 1C:
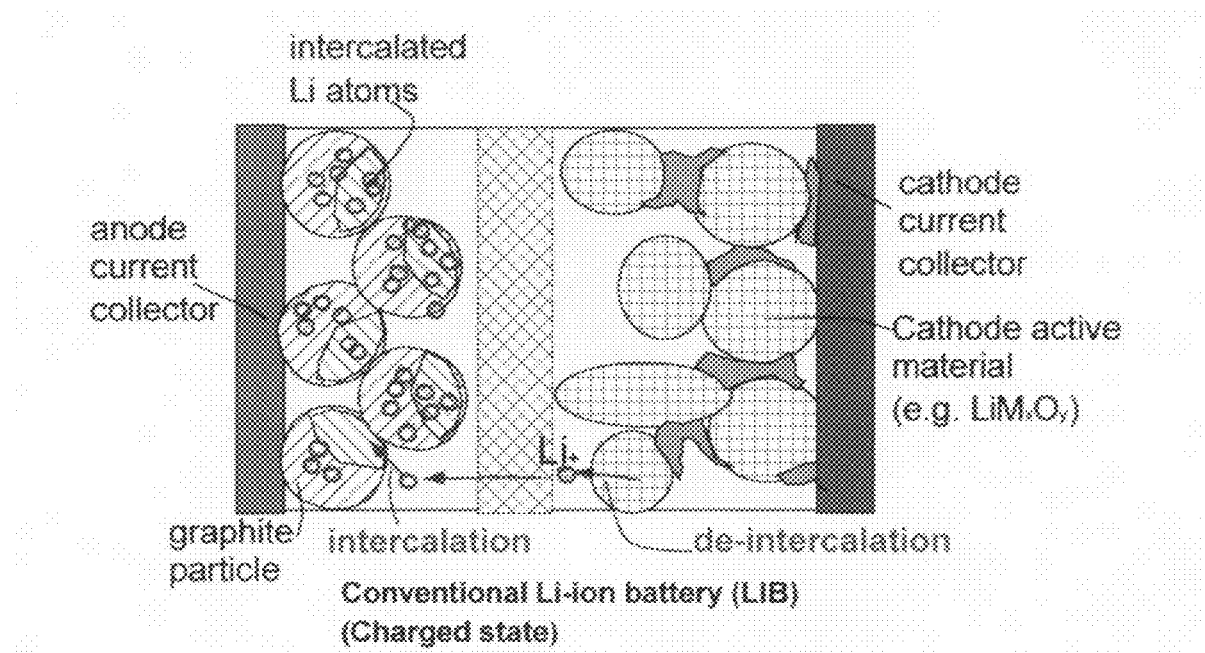
Figure 1D:
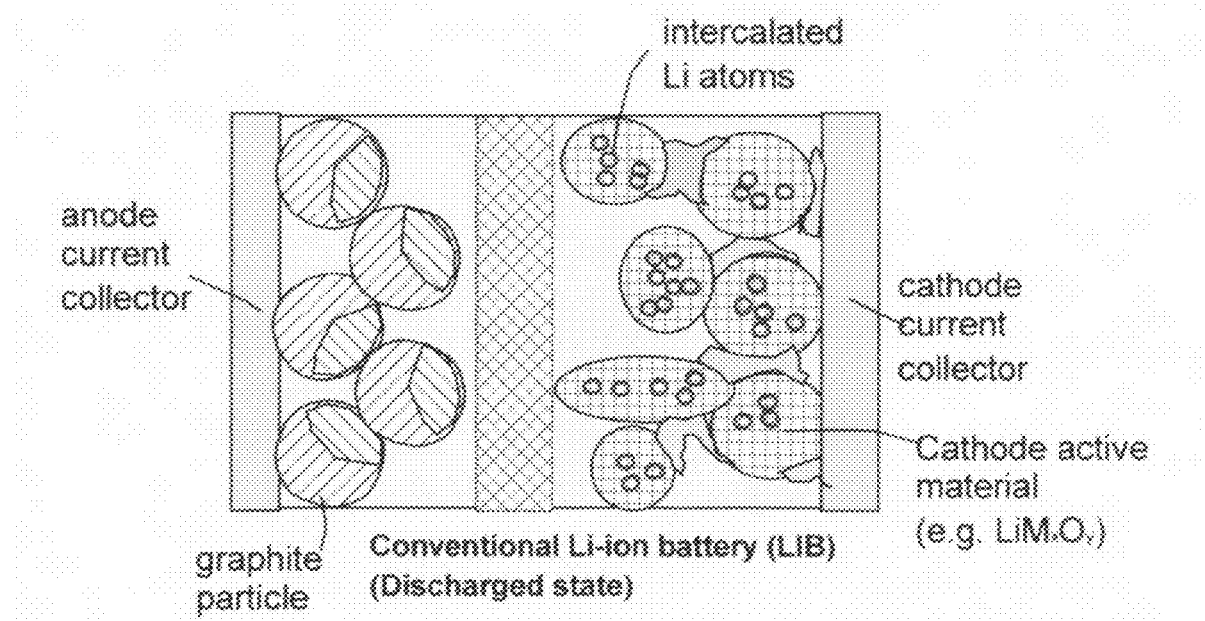
Figure 1E:
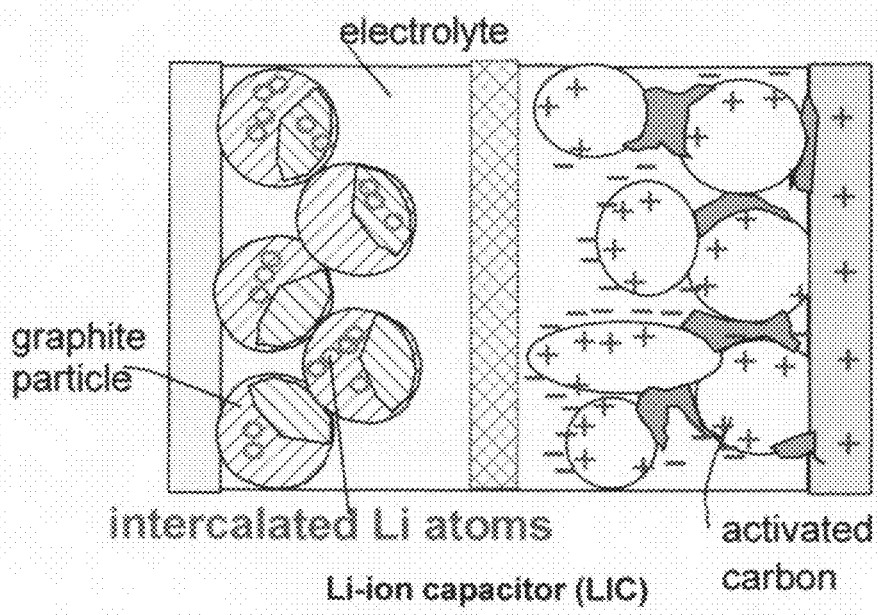
Figure 1F:
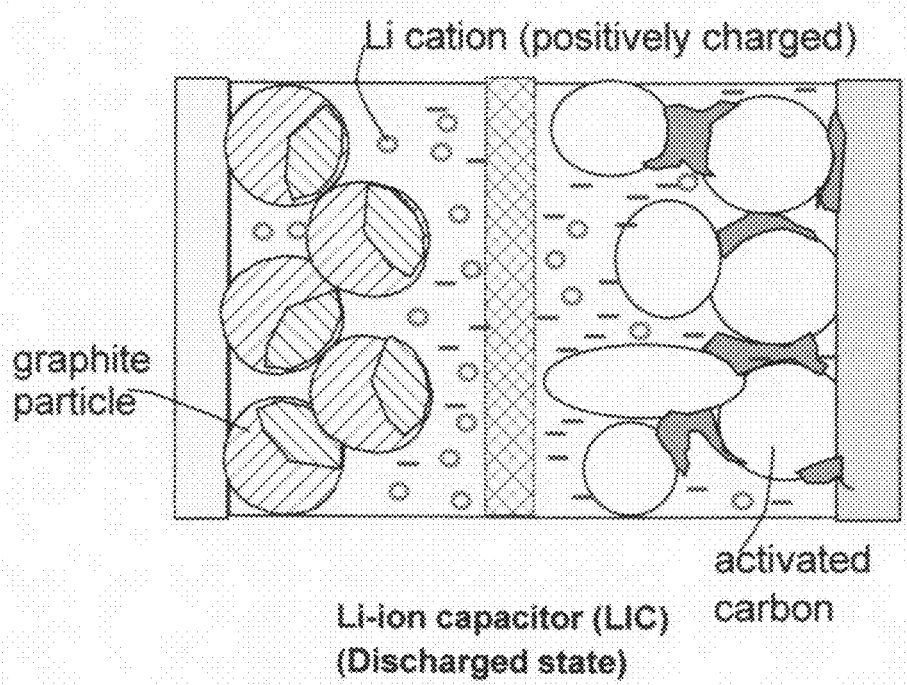
Figure 1G:
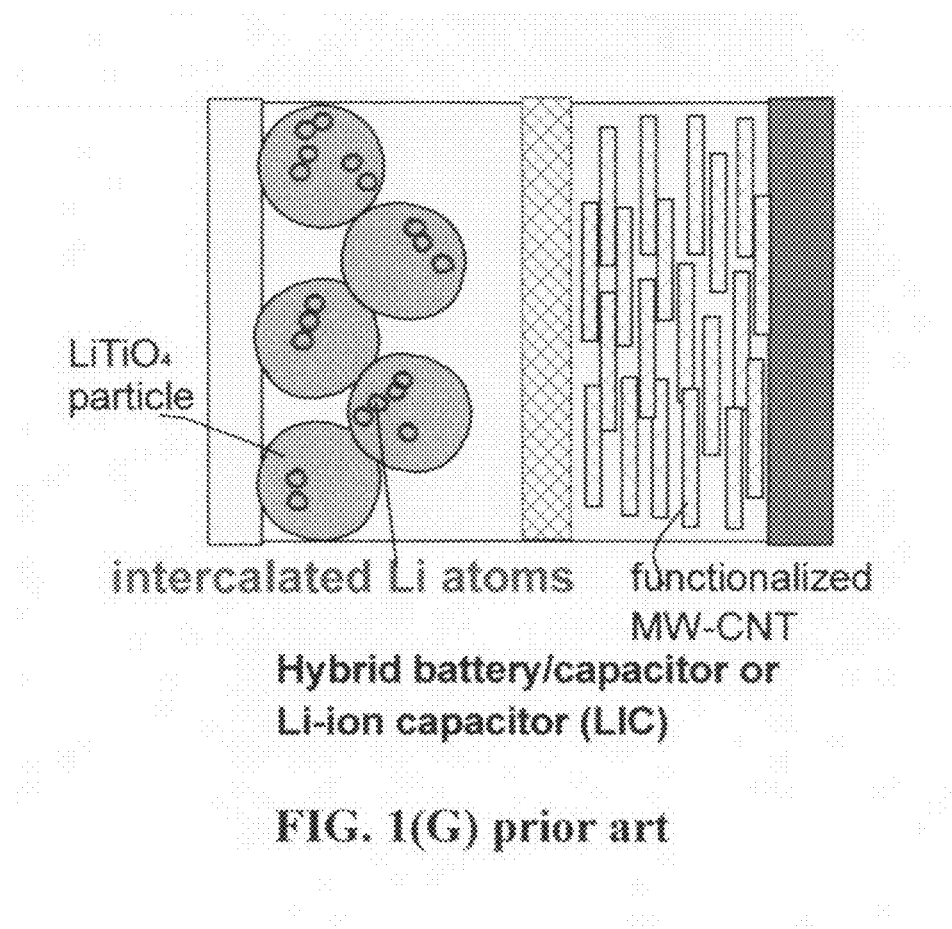
Figure 2:
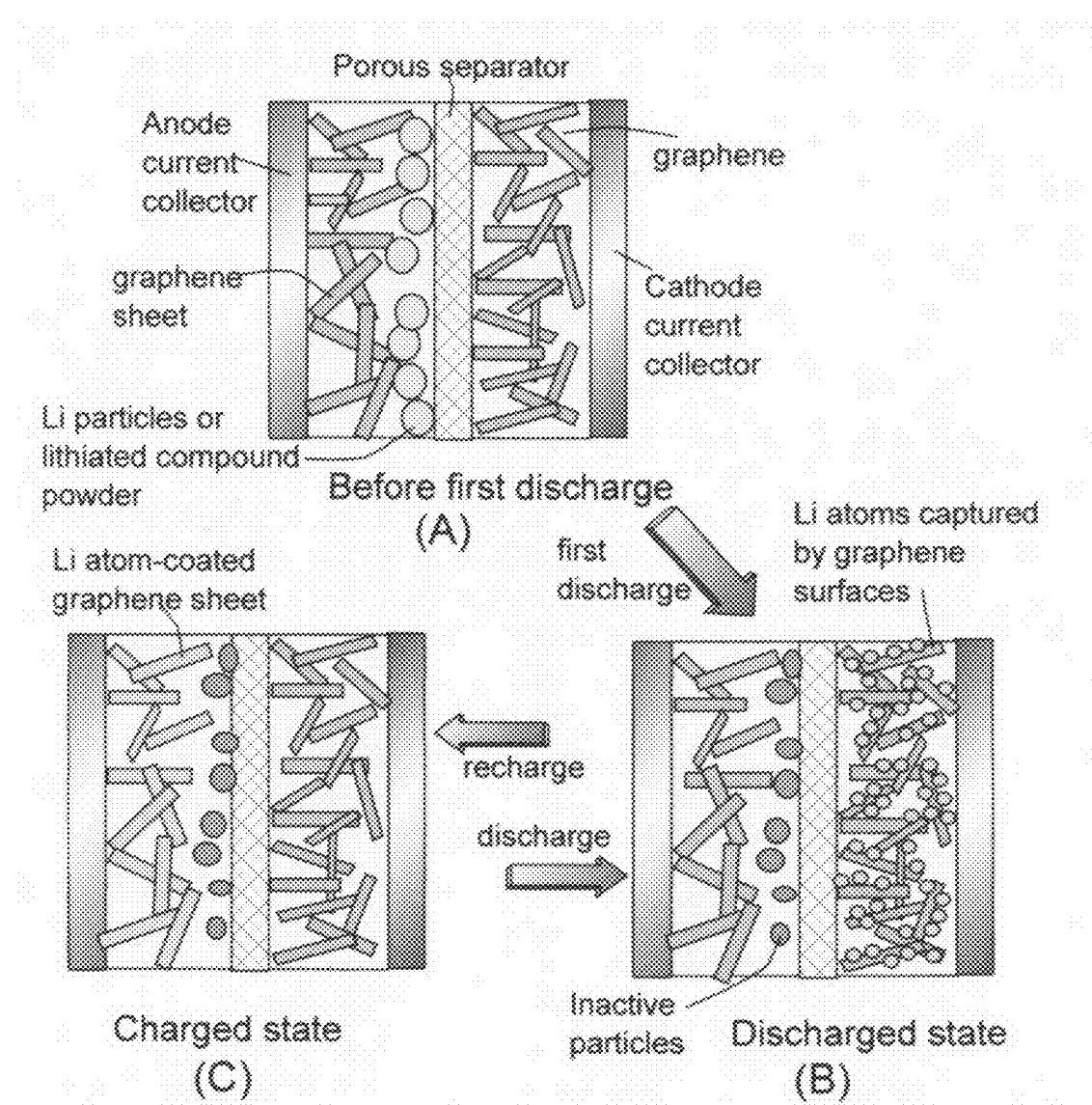
FIG. 2 (A) The structure of a SMC when it is made (prior to the first discharge or charge cycle), containing a nano-structured material at the anode, a lithium source (e.g. lithium foil, lithium powder, or lithiated compound powder dispersed in the liquid electrolyte of the anode zone), a porous separator, liquid electrolyte, a porous nano-structured material at the cathode having a high specific surface area; (B) The structure of this SMC after its first discharge operation (lithium is ionized with the lithium ions diffusing through liquid electrolyte to reach the surfaces of nano-structured cathode and get rapidly captured by these surfaces); (C) The structure of this battery device after being re-charged (lithium ions are released from the cathode surfaces, diffusing through liquid electrolyte to reach the surfaces of the nano-structured anode and get rapidly plated onto these surfaces). The large surface areas can serve as a supporting substrate onto which massive amounts of lithium ions can electro-deposit concurrently.

In some of our SMC cells disclosed recently, a lithiated compound was suggested as a possible lithium source (e.g, FIG. 2(A)), but this compound was not used as an anode active material. This prelithiated compound in a SMC was dispersed near an electrode to emit lithium ions into electrolyte so that these released lithium ions could be shuttled between anode surfaces and cathode surfaces. This compound was not connected to an anode current collector through a binder and/or a conductive additive. After the first discharge, this lithiated compound was completely dispersed in the electrolyte (FIG. 2(B)), no longer electrically connected to the anode or current collector. This lithiated compound was not an anode active material in a SMC and, after the first cycle, did not participate in lithium intercalation or de-intercalation after the first cycle (i.e. after the electrochemical formation step). Furthermore, this lithiated compound was not in the form of a nano particle, nano disc, nano platelete, nano wire, nano-rod, nano belt, nano scroll, nano tube, nano filament, nano coating, or nano film as herein specified.

In a further preferred embodiment, the anode active material contains a mixture of a high capacity anode material and a high rate capable anode material, wherein the high rate capable anode material is selected from nano-scaled particles or filaments of a lithium transition metal oxide, lithiated $CO_3O_4$, lithiated $Mn_3O_4$, lithiated $Fe_3O_4$, $Li_4Ti_5O_{12}$, or a combination thereof, and the high capacity anode material is selected from pre-lithiated Si, Ge, Sn, SnO, or a combination thereof.

Preferably, the anode active material is prelithiated to an initial specific capacity of no less than 500 mAh/g (more preferably no less than 700 mAh/g, even more preferably no less than 1,000 mAh/g, further preferably no less than 1,500 mAh/g, and most preferably no less than 2,000 mAh/g) based on the anode active material weight. Preferably, when the lithium-ion cell containing such a prelithiated anode active material is discharged, the anode active material is not fully discharged; instead, the anode active material maintains at least 50% of the initial specific capacity. Materials such as Si, Ge, and Sn oxide can be prelithiated to an initial capacity of >1000 mAh/g; Si can be prelithiated to >4,000 mAh/g. These are preferred choices for an anode active material.

The meso-porous material for use in the cathode of the instant invention is nano graphene platelet (NGP), including single-layer and multi-layer graphene. Single-layer graphene or the graphene plane (a layer of carbon atoms forming a hexagonal or honeycomb-like structure) is a common building block of a wide array of graphitic materials, including natural graphite, artificial graphite, soft carbon, hard carbon, coke, activated carbon, carbon black, etc. In these graphitic materials, typically multiple graphene sheets are stacked along the graphene thickness direction to form an ordered domain or crystallite of graphene planes. Multiple crystallites of domains are then connected with disordered or amorphous carbon species. In the instant application, we are able to extract or isolate these crystallites or domains to obtain multiple-layer graphene platelets out of the disordered carbon species. In some cases, we exfoliate and separate these multiple-graphene platelets into isolated single-layer graphene sheets.

In the present application, nano graphene platelets (NGPs) or "graphene materials" collectively refer to single-layer and multi-layer versions of graphene, graphene oxide, graphene fluoride, hydrogenated graphene, nitrogenated graphene, doped graphene, etc.

The thickness of an NGP is no greater than 100 nm and, in the present application, no greater than 10 nm (preferably no greater than 5 nm). The NGP may be single-layer graphene. In the presently defined NGPs, there is no limitation on the length and width, but they are preferably smaller than 10 μm and more preferably smaller than 1 μm. We have been able to produce NGPs with length smaller than 100 nm or larger than 10 μm. The NGP can be pristine graphene (with essentially 0% oxygen content) or graphene oxide (typically from 10 up to approximately 45% by weight oxygen). Graphene oxide can be thermally or chemically reduced to become reduced graphene oxide (typically with an oxygen content of 1-10%, mostly below 5% by weight). For use in the cathode of the lithium-ion cell, the oxygen content is preferably in the range of 0% to 10% by weight, and more preferably in the range of 0% to 5% by weight. The specific surface area accessible to liquid electrolyte is the single most important parameter in dictating the energy and power densities of a lithium-ion cell of the present invention.

Despite the fact that individual graphene sheets have an exceptionally high specific surface area, flat-shaped graphene sheets prepared by conventional routes have a great tendency to re-stack together or overlap with one another, thereby dramatically reducing the specific surface area that is accessible by the electrolyte. We have developed a new breed of graphene, herein referred to as the curved graphene platelet or sheet. Curved NGPs are capable of forming a meso-porous structure having a desired pore size range (e.g. slightly >2 nm) when they were stacked together to form an electrode. This size range appears to be conducive to being accessible by the commonly used lithium-containing electrolytes.

The curved NGPs may be produced by using the following recommended procedures:
(a) dispersing or immersing a laminar graphite material (e.g., natural graphite powder) in a mixture of an intercalant and an oxidant (e.g., concentrated sulfuric acid and nitric acid, respectively) to obtain a graphite intercalation compound (GIC) or graphite oxide (GO);
(b) exposing the resulting GIC or GO to a thermal shock, preferably in a temperature range of 600-1,100° C. for a short period of time (typically 15 to 60 seconds), to obtain exfoliated graphite or graphite worms (some oxidized NGPs with a thickness <100 nm could be formed at this stage if the intercalation/oxidation step was allowed to proceed for a sufficiently long duration of time; e.g. >24 hours);
(c) dispersing the exfoliated graphite to a liquid medium to obtain a graphene-liquid suspension (a functionalizing agent may be added into this suspension if functional groups are desired, as in our co-pending application);
(d) aerosolizing the graphene-liquid suspension into liquid droplets while concurrently removing the liquid to recover curved NGPs. Without the aerosolizing step, the resulting graphene platelets tend to be flat-shaped.

It may be noted that steps (a) to (b) are the most commonly used steps to obtain exfoliated graphite and graphene oxide platelets in the field. Step (d) is essential to the production of curved graphene sheets. Oxidized NGPs or GO platelets may be chemically reduced to recover conductivity properties using hydrazine as a reducing agent, before, during, or after chemical functionalization.

In 2007, we reported a direct ultrasonication method of producing pristine nano graphene directly from graphite particles dispersed in a surfactant-water suspension [A. Zhamu, et al, "Method of Producing Exfoliated Graphite, Flexible Graphite, and Nano-Scaled Graphene Plates," U.S. patent application Ser. No. 11/800,728 (May 8, 2007)]. This method entails dispersing natural graphite particles in a low surface tension liquid, such as acetone or hexane. The resulting suspension is then subjected to direct ultrasonication for 10-120 minutes, which produces graphene at a rate equivalent to 20,000 attempts to peel off graphene sheets per second per particle. The graphite has never been intercalated or oxidized and, hence, requires no subsequent chemical reduction. This method is fast, environmentally benign, and can be readily scaled up, paving the way to the mass production of pristine nano graphene materials. The same method was later studied by others and now more commonly referred to as the "liquid phase production."

When a multi-layer graphene platelet is present in the cathode of the presently invented lithium-ion cell, the discharge operation of the cell can involve intercalating lithium into an inter-graphene space in a multi-layer graphene platelet and capturing and storing lithium on surfaces of a single-layer graphene sheet (if present) or multi-layer graphene platelet.

The following examples serve to illustrate the preferred embodiments of the present invention and should not be construed as limiting the scope of the invention:

Example 1

Graphene Oxide from Sulfuric Acid Intercalation and Exfoliation of MCMBs

Meso-carbon microbeads (MCMBs) were supplied from China Steel Chemical Co. This material has a density of about 2.24 g/cm$^3$ with a median particle size of about 16 μm. MCMB (10 grams) were intercalated with an acid solution (sulfuric acid, nitric acid, and potassium permanganate at a ratio of 4:1:0.05) for 48 hours. Upon completion of the reaction, the mixture was poured into deionized water and filtered. The intercalated MCMBs were repeatedly washed in a 5% solution of HCl to remove most of the sulphate ions. The sample was then washed repeatedly with deionized water until the pH of the filtrate was neutral. The slurry was dried and stored in a vacuum oven at 60° C. for 24 hours. The dried powder sample was placed in a quartz tube and inserted into a horizontal tube furnace pre-set at a desired temperature, 800° C. for 30 seconds to obtain a graphene material. A small quantity of each sample was mixed with water and ultrasonicated at 60-W power for 10 minutes to obtain a suspension. A small amount was sampled out, dried, and investigated with TEM, which indicated that most of the NGPs were between 1 and 10 layers. The graphene-water suspension was used for subsequent preparation of a graphene cathode.

Example 2

Oxidation and Exfoliation of Natural Graphite

Graphite oxide was prepared by oxidation of graphite flakes with sulfuric acid, sodium nitrate, and potassium permanganate at a ratio of 4:1:0.05 at 30° C. for 48 hours, according to the method of Hummers [U.S. Pat. No. 2,798,878, Jul. 9, 1957]. Upon completion of the reaction, the mixture was poured into deionized water and filtered. The sample was then washed with 5% HCl solution to remove most of the sulfate ions and residual salt and then repeatedly rinsed with deionized water until the pH of the filtrate was approximately 7. The intent was to remove all sulfuric and nitric acid residue out of graphite interstices. The slurry was dried and stored in a vacuum oven at 60° C. for 24 hours.

The dried, intercalated (oxidized) compound was exfoliated by placing the sample in a quartz tube that was inserted into a horizontal tube furnace pre-set at 1,050° C. to obtain highly exfoliated graphite. The exfoliated graphite was dispersed in water along with a 1% surfactant at 45° C. in a flat-bottomed flask and the resulting graphene oxide (GO) suspension was subjected to ultrasonication for a period of 15 minutes.

Example 3

Direct Ultrasonication of Natural Graphite to Produce Pristine Graphene

In a typical procedure, five grams of graphite flakes, ground to approximately 20 μm or less in sizes, were dispersed in 1,000 mL of deionized water (containing 0.1% by weight of a dispersing agent, Zonyl® FSO from DuPont) to obtain a suspension. An ultrasonic energy level of 85 W (Branson S450 Ultrasonicator) was used for exfoliation, separation, and size reduction of graphene sheets for a period of 15 minutes to 2 hours.

Example 4

Lithium-Ion Cells Featuring Prelithiated and Non-Lithiated Cobalt Oxide ($Co_3O_4$) Anodes and Graphene Cathode An appropriate amount of inorganic salts $Co(NO_3)_2.6H_2O$ was added to an ammonia solution ($NH_3.H_2O$, 25 wt %).

The resulting precursor suspension was stirred for 4 hours under an argon flow to ensure a complete reaction. The resulting $Co(OH)_2$ precursor suspension was filtered and dried under vacuum at 70° C. to obtain a $Co(OH)_2$. This precursor was calcined at 450° C. in air for 2 h to form $Co_3O_4$ powder.

The working electrodes (for use as an anode in a lithium-ion cell) were prepared by mixing 85 wt % active material ($Co_3O_4$ powder), 7 wt % acetylene black (Super-P), and 8 wt % polyvinylidene fluoride (PVDF, 5 wt % solid content) binder dissolved in N-methyl-2-pyrrolidine (NMP). After coating the slurries on Cu foil, the electrodes were dried at 120° C. in vacuum for 2 h to remove the solvent before pressing. The electrode prepared was divided into two pieces: one piece was for use as a non-prelithiated anode and the other piece was prelithiated electrochemically by following the following procedure:

The second piece of $Co_3O_4$ electrode was immersed in a liquid electrolyte prepared by dissolving 1 M $LiPF_6$ electrolyte solution in a mixture of ethylene carbonate (EC) and diethyl carbonate (DEC) (EC-DEC, 1:1 v/v). A piece of lithium foil was used as a counter-electrode, which was also immersed in the electrolyte. Direct current was used to charge the $Co_3O_4$ electrode until an amount of lithium equivalent to approximately 860 mAh/g based on cobalt oxide weight was inserted into $Co_3O_4$. The prelithiation procedure was performed in an argon-filled glove-box.

Then, the lithiated and non-lithiated electrodes were separately cut into disks ($\phi$=12 mm) for use as an anode. In the cell containing a non-lithiated $Co_3O_4$ anode, a thin sheet of lithium foil (as a lithium source) was attached to the anode surface and a piece of porous separator was, in turn, stacked on top of the lithium foil. Pieces of graphene paper prepared in example 1 and coated on an aluminum foil (cathode current collector) were used as a cathode to form a CR2032 coin-type cell. Celgard 2400 membrane was used as separator, and 1 M $LiPF_6$ electrolyte solution dissolved in a mixture of ethylene carbonate (EC) and diethyl carbonate (DEC) (EC-DEC, 1:1 v/v) was used as cell electrolyte. The cell assembly was performed in an argon-filled glove-box. The CV measurements were carried out using a CH-6 electrochemical workstation at a scanning rate of 1 mV/s.

Comparative Example 4

Li-Ion Cells Containing a Prelithiated or Non-Lithiated Cobalt Oxide ($Co_3O_4$) Anode and a Lithium Iron Phosphate Cathode Lithium iron phosphate $LiFePO_4$ is a promising candidate cathode material in lithium-ion batteries for electric vehicle applications. The advantages of $LiFePO_4$ as a cathode active material includes a high theoretical capacity (170 mAh/g), environmental benignity, low resource cost, good cycling stability, high temperature capability, and prospect for a safer cell compared with $LiCoO_2$. For comparison purposes, we have also prepared similar Li-ion cells containing $LiFePO_4$ as the cathode active material, instead of graphene cathode.

The electrochemical performance of the prelithiated $Co_3O_4$/graphene cell, non-lithiated $Co_3O_4$/Li source/graphene cell, lithiated $Co_3O_4$/$LiFePO_4$ cell, and non-lithiated $Co_3O_4$/$LiFePO_4$ cell was also evaluated by galvanostatic charge/discharge cycling at a current density of 50 mA/g, using a LAND electrochemical workstation.

Figure 5:
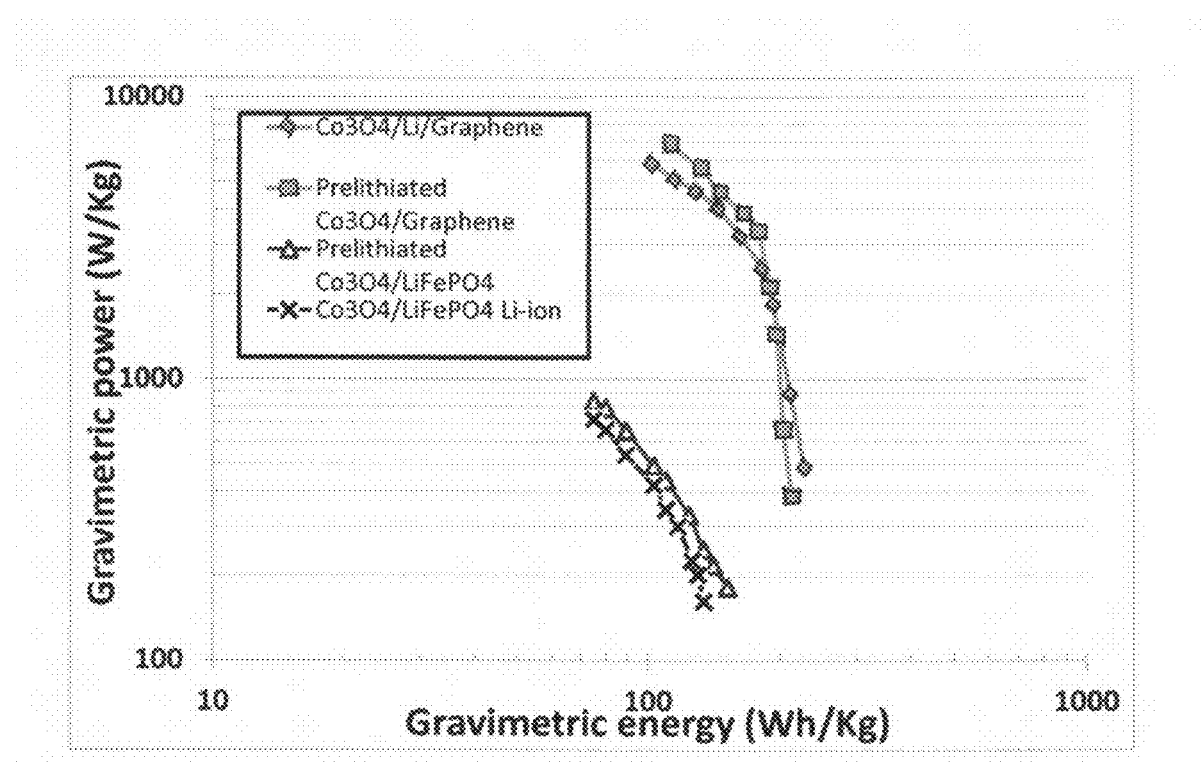
FIG. 5 Ragone plot of four types of electrochemical cells: a L-ion cell using graphene as a cathode active material, a $Co_3O_4$ anode active material, and a Li foil as a lithium source; another lithium-ion ion cell using graphene as a cathode active material and a prelithiated $Co_3O_4$ anode active material; a prior art Li-ion cell using prelithiated $Co_3O_4$ as the anode active material and $LiFePO_4$ as the cathode active material; and another prior art Li-ion cell using non-prelithiated $Co_3O_4$ as the anode active material and $LiFePO_4$ as the cathode active material.

The Ragone plots of four types of electrochemical cells are presented in FIG. 5. These data have demonstrated that the presently invented L-ion cells using graphene as a cathode active material exhibit exceptional energy density and relatively good power density. Both of the new cells (one having a non-lithiated $Co_3O_4$ anode active material and Li foil as a lithium source and the other having a prelithiated $Co_3O_4$ anode active material) have an energy density higher than 210 Wh/kg, which is significantly greater than the typical 120-150 Wh/kg of prior art lithium-ion cells. Most surprisingly, these cells can also deliver a power density that is 10 times higher than those of prior art Li-ion cells (typically <0.5 kW/kg). The power density of the new cell reaches 6.7 kW/kg, which has never been achieved with any prior art lithium-ion cells. The implementation of graphene as a cathode active material has made it possible to achieve both high energy density and high power density. As a point of reference, the typical power density of symmetric supercapacitors (noted for their superior power density) is 3-6 kW/kg; but their energy density is 5-8 Wh/kg.

Example 5

Li-Ion Cells Having a Prelithiated Tin Oxide (Nano- and Micron-Scaled) Anode and a Graphene Cathode Tin oxide ($SnO_2$) nano particles were obtained by the controlled hydrolysis of $SnCl_4 \cdot 5H_2O$ with NaOH using the following procedure: $SnCl_4 \cdot 5H_2O$ (0.95 g, 2.7 m-mol) and NaOH (0.212 g, 5.3 m-mol) were dissolved in 50 mL of distilled water each. The NaOH solution was added dropwise under vigorous stirring to the tin chloride solution at a rate of 1 mL/min. This solution was homogenized by sonication for 5 min. This solution was divided into two portion. One portion of the resulting hydrosol was reacted with the graphene oxide dispersion prepared in Example 2 for 3 hours and the other portion was not mixed with graphene oxide.

To this graphene oxide mixed solution and un-mixed solution separately, few drops of 0.1 M of $H_2SO_4$ were added to flocculate the product. The precipitated solid was collected by centrifugation, washed with water and ethanol, and dried in vacuum. The dried product was heat-treated at 400° C. for 2 h under Ar atmosphere. The graphene oxide-assisted sample was found to contain mostly nano-scaled tin oxide particles with an average particle size of 27 nm. The presence of graphene oxide serves to regulate the nucleation and growth of tin oxide crystals, promoting the formation of nano particles. The other sample contains sub-micron and micron-scaled tin oxide particles with an average diameter >1.3 μm.

The battery cells from the graphene oxide-regulated particulates (containing nano-scaled $SnO_2$) and the micron-scaled $SnO_2$ particles (having acetylene black particles as a conductive filler) were prepared using a procedure described in Example 4. The tin oxide was electrochemically prelithiated up to a specific capacity of approximately 1,200 mAh/g. The testing methods were also similar to those used in Example 4.

Comparative Example 5A

Prelithiated Tin Oxide as a Lithium Source in a SMC Containing a Graphene Anode and a Graphene Cathode For comparison purposes, we have also prepared a corresponding SMC cell containing graphene as the cathode active material and identical graphene (but in a smaller amount) as the anode active material (coated on a Cu foil current collector). The anode active material (graphene sheets) was mixed with 5% carbon black particles and 10% by weight PVDF resin binder to form an anode of good structural integrity. Powder of prelithiated tin oxide (recovered from a prelithiated electrode) was then sprayed over the surface of anode layer and then covered with a separator layer. There was no resin binder used to bind the lithiated compound (as a lithium source) to the anode, as illustrated in FIG. 2(A).

Comparative Example 5B

Prelithiated Tin Oxide as the Anode Active Material and $LiCoO_2$ as the Cathode Active Material in a Conventional Li-Ion Cell For comparison purposes, we have also prepared a corresponding lithium-ion cell containing prelithiated tin oxide as the anode active material and $LiCoO_2$ as the cathode active material.

Figure 6:
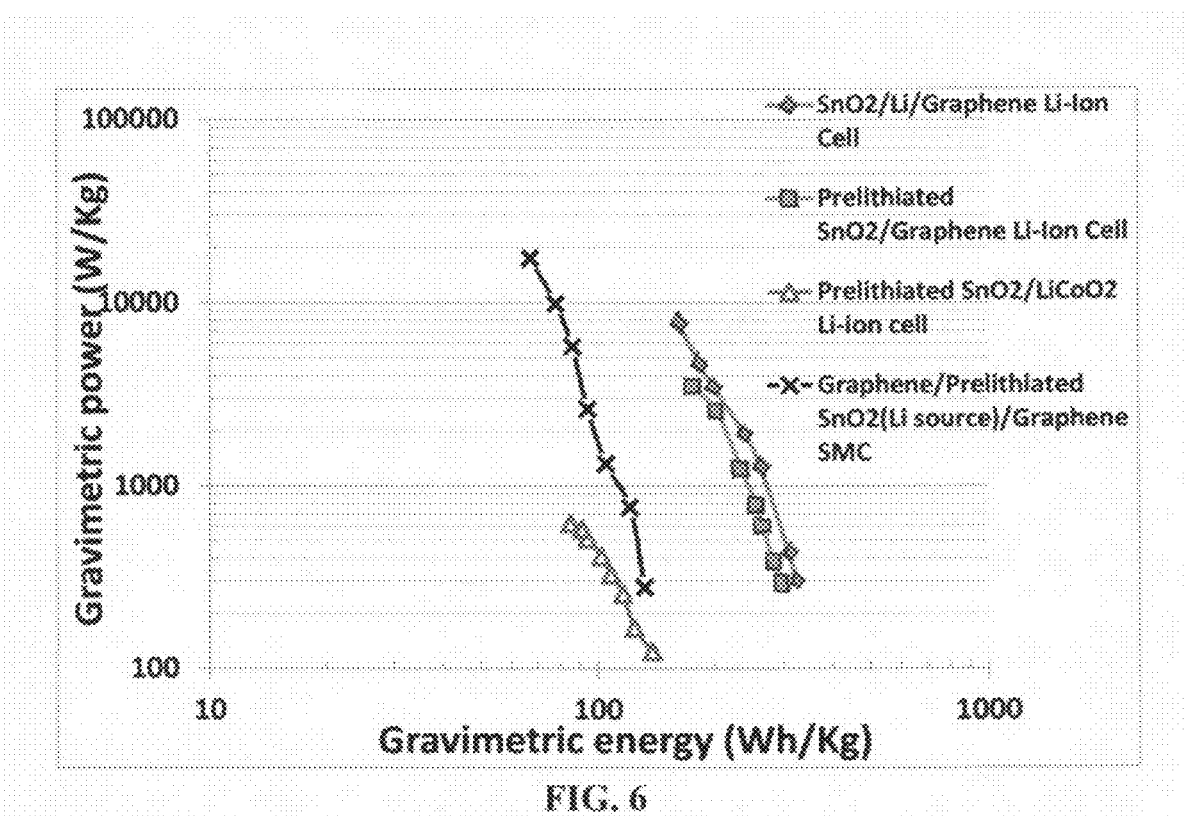
FIG. 6 Ragone plot of four types of electrochemical cells: a L-ion cell using graphene as a cathode active material, $SnO_2$ as an anode active material, and Li foil as a lithium source; another lithium-ion cell using graphene as a cathode active material and prelithiated $SnO_2$ as an anode active material; a prior art SMC cell using graphene as an anode active material, prelithiated $SnO_2$ powder as the lithium source (not as an anode active material), and graphene as the cathode active material; and a prior art Li-ion cell using prelithiated $SnO_2$ as the anode active material and $LiCoO_2$ as a cathode active material.

Presented in FIG. 6 are the Ragone plots of four types of electrochemical cells. Two of the cells represent two examples of the presently invented graphene cathode-based Li-ion cells: one containing non-lithiated $SnO_2$ as an anode active material and Li foil as a lithium source and the other containing prelithiated $SnO_2$ as an anode active material. In both cases, the SnO2 particles were bonded to the anode current collector with a resin binder, along with a conductive additive. The cell with a lithium source exhibits a higher energy density. These two cells exhibit an exceptionally high energy density (>300 Wh/kg), which is significantly greater than those of a prior art SMC cell (using graphene as an anode active material, prelithiated $SnO_2$ powder as the lithium source, and graphene as the cathode active material) and a prior art Li-ion cell (using prelithiated $SnO_2$ as the anode active material and $LiCoO_2$ as a cathode active material). There has been no cathode material thus far reported that could enable a lithium-ion cell to exhibit an energy density higher than 300 Wh/kg.

Example 6

Prelithiated Si Nanowires and Prelithiated Si Micron Particles as Anodes

In a typical procedure for preparing Si nanowires, approximately 2.112 g of silicon powders (average diameter 2.64 μm) were mixed with 80 ml of a 0.1M aqueous solution of $Ni(NO_3)_2 \cdot 6H_2O$ and vigorously stirred for 30 min. Then, water was evaporated in a rotary evaporator and the solid remnants were completely dried in an oven at 150° C. The final sample (Ni-impregnated Si powers) was obtained by grinding the solids in a mortar.

Subsequently, 0.03 g of Ni-impregnated Si particles was placed in a quartz boat, and the boat was placed in a tube furnace. The sample was reduced at 500° C. for 4 hours under flowing Ar (180 sccm) and $H_2$ (20 sccm), then the temperature was raised to 990° C. to synthesize Si nanowires. For the purpose of separating Si nanowires, for instance, every 0.1 g of the reacted Si powders was mixed with 10 ml of ethanol and the resulting mixture was sonicated for 1 hour. Subsequently, Si nanowires were separated from the Si powders by centrifuge at 5,000 rpm for 10 min.

Si nanowires and Si micron particles, separately, were mixed with acetylene black particles to prepare anodes. The electrodes made were lithiated by using a procedure similar to that described in Example 4. Coin cells were similarly made using pristine graphene prepared in Example 3 as the cathode active material. For comparison, a surface-mediated cell (SMC) using the same pristine graphene cathode was prepared. This SMC contains a small amount of graphene coated on a copper foil as an anode (but without the prelithiated Si nano-wires), and a piece of lithium foil as a lithium source.

Coin cells using graphene as a cathode active material (90% graphene sheets and 10% PVDF as a resin binder) and pre-lithiated Si particles were made and tested. A series of coin cells were made that contain graphene nano sheets of different thicknesses, resulting in cathodes of different specific surface areas. In all cells, the separator used was one sheet of micro-porous membrane (Celgard 2500). The current collector for the cathode was a piece of carbon-coated aluminum foil and that for the anode was Cu foil. The electrolyte solution was 1 M $LiPF_6$ dissolved in a mixture of ethylene carbonate (EC) and dimethyl carbonate (DMC) with a 3:7 volume ratio. The separator was wetted by a minimum amount of electrolyte to reduce the background current. Cyclic voltammetry and galvanostatic measurements of the lithium cells were conducted using an Arbin 32-channel supercapacitor-battery tester at room temperature (in some cases, at a temperature as low as −40° C. and as high as 60° C.).

Comparative Example 6A

A SMC with a Prelithiated Graphene Anode and a Graphene Cathode

A SMC cell was also made from a sheet of pristine graphene material paper as a cathode active material and prelithiated pristine graphene powder as an anode active material coated on Cu foil current collector.

Comparative Example 6B

Conventional Li-Ion Cell Featuring Prelithiated Si Nanowires as the Anode Active Material and $LiCoO_2$ as the Cathode Active Material For comparison purposes, we have also prepared similar Li-ion cells containing prelithiated Si Nanowires as the anode active material and $LiFePO_4$ as the cathode active material, instead of graphene cathode.

Figure 7:
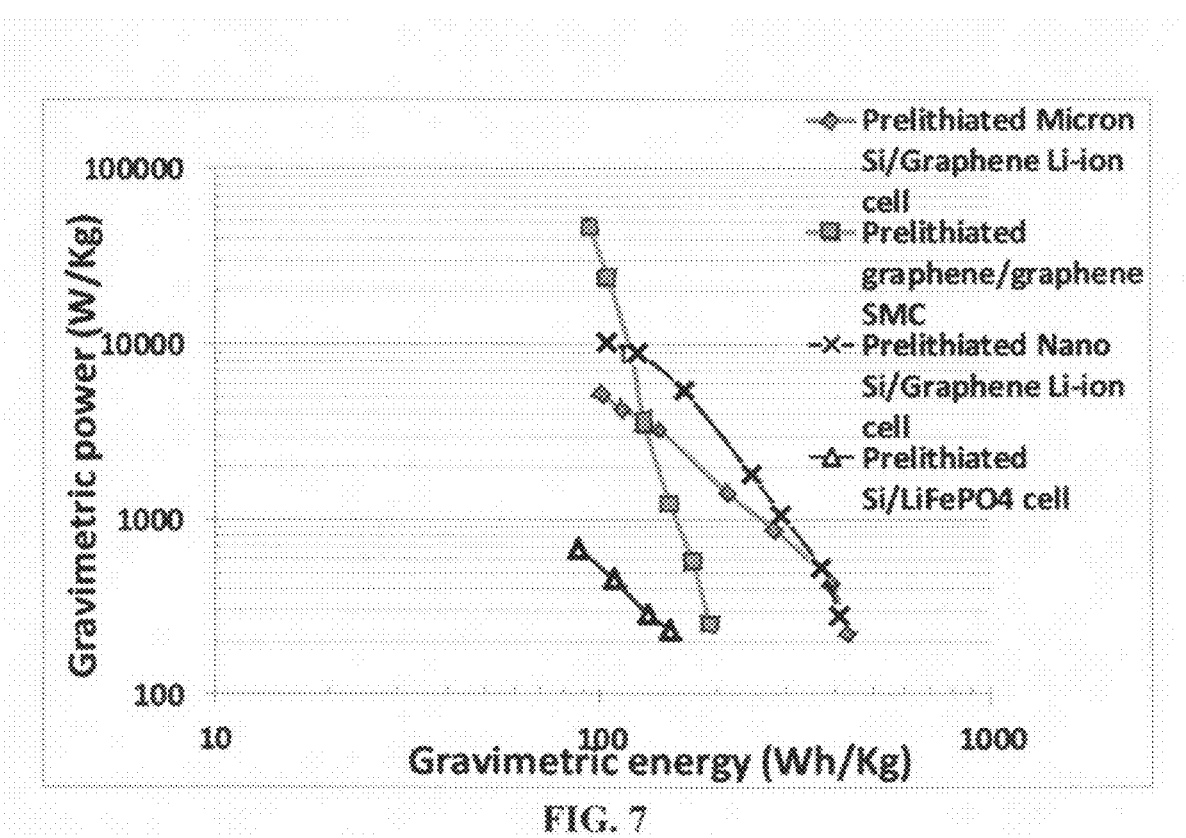
FIG. 7 Ragone plot of four types of electrochemical cells: a L-ion cell using graphene as a cathode active material and prelithiated micron-scaled Si particles as an anode active material; another lithium-ion cell using graphene as a cathode active material and prelithiated Si nanowires as an anode active material; a prior art SMC cell using prelithiated graphene as an anode active material and non-lithiated graphene as the cathode active material; and a prior art Li-ion cell using prelithiated Si nanowires as the anode active material and $LiFePO_4$ as a cathode active material.

The Ragone plots of four types of electrochemical cells are shown in FIG. 7. Both graphene cathode-based L-ion cells of the present invention are capable of delivering an energy density greater than 400 Wh/kg, an unprecedented value of all lithium-ion cells ever reported. These cells are also capable of delivering a power density of 5-10 kW/kg, comparable to those of the best symmetric supercapacitors. The anode containing Si nano-wires appears to deliver a higher power density as compared with its micron particle counterpart. The prior art SMC cell using prelithiated graphene as an anode active material and non-lithiated graphene as the cathode active material delivers a highest power density due to the notion that its operation at both the anode and the cathode is lithium intercalation-free. However, the two lithium-ion cells can store three times higher amount of energy per unit cell weight.

Figure 8:
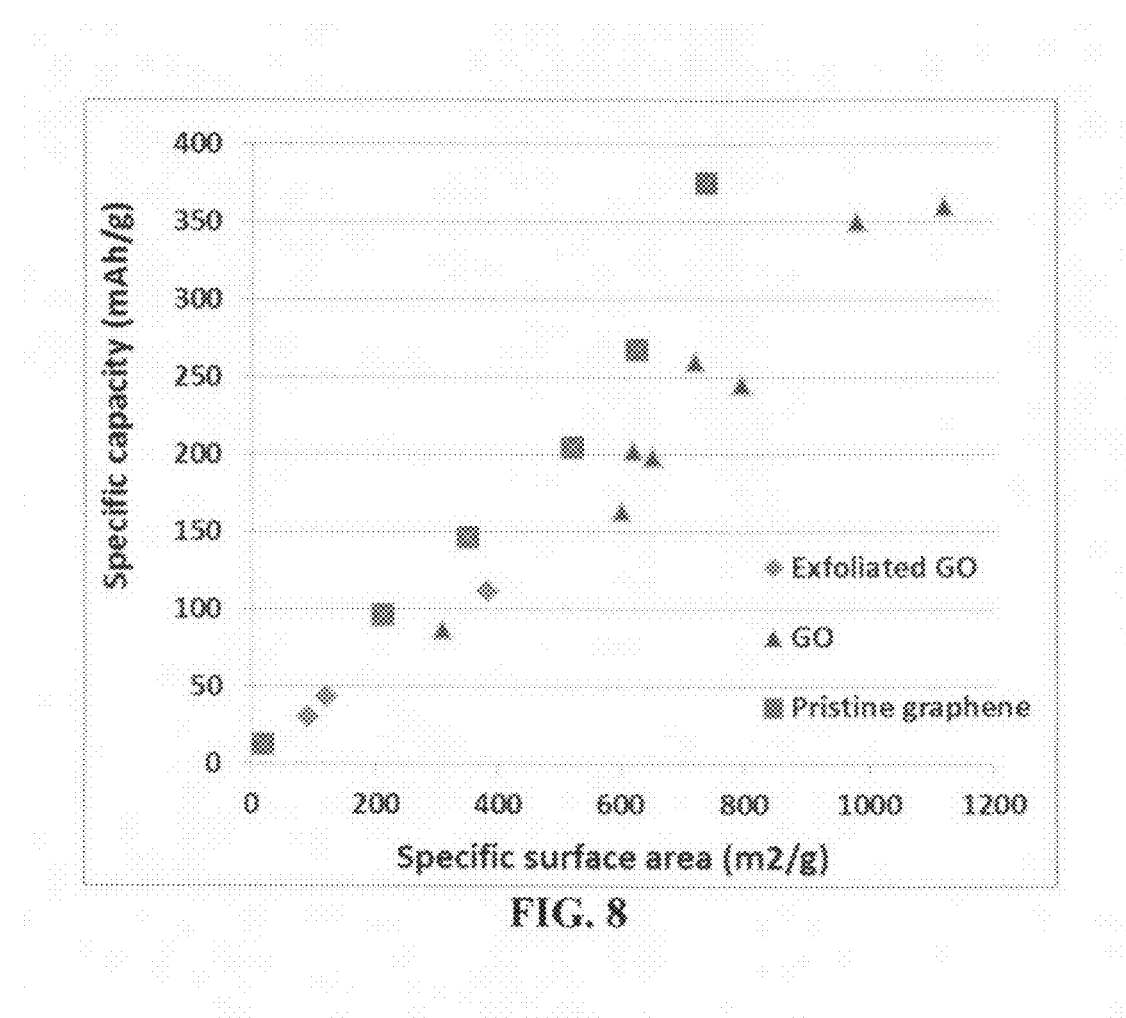
FIG. 8 The specific capacity values plotted as a function of the specific surface areas of various graphene cathodes.

The specific capacity values of several graphene cathodes are plotted in FIG. 8 as a function of the specific surface areas of the cathode. This chart indicates that pristine graphene is significantly more effective than graphene oxide-based cathode. This is also quite unexpected since the electrochemist would tend to expect that graphene oxide, having more functional groups such as carbonyl or carboxylic, should be more capable of capturing and storing lithium ions. The specific surface area of the cathode electrode (not just the surface area of the cathode active material) was found to play a critical role in dictating the energy density and power density of the high-capacity lithium-ion cells of the present invention.

In summary, we have developed a new lithium-ion battery technology based on new electrochemistry:

(1) We have discovered that isolated graphene sheets can be used as a cathode active material, as opposed to an anode active material, of a lithium-ion cell. It has been commonly and generally accepted that if a material can be used as an anode active material of a lithium-ion cell, the same material cannot be used as a Li-ion cell cathode active material. There has been no reported example of using a common anode active material as a cathode active material of the lithium-ion cell. We have defied this expectation.

(2) We have further observed that graphene cathode in a lithium-ion cell as herein specified can exhibit a specific capacity significantly higher than 1,000 mAh/g and, in several samples, the capacity has exceeded 2,000 mAh/g. All the commonly used cathode active materials for lithium-ion cells have a specific capacity lower than 200 mAh/g.

(3) Further, when graphene was used as an anode active material of a lithium-ion cell, it suffered a huge first-cycle irreversibility and rapid capacity fade as charges/discharges proceeded. For instance, an initial lithium storage capacity of typically 600-1,500 mAh/g was reported, but these graphene-based anodes lost 50% of its capacity after first cycle or first few cycles, likely due to the formation of solid-electrolyte interface (SEI). This irreversibility could not be prevented if graphene is used as an anode active material and no one has been able to overcome this serious issue. Surprisingly, when graphene is used as a cathode active material, the resulting Li-ion cell as herein specified exhibits a nearly 100% first-cycle efficiency and nearly 100% efficiency for thousands of cycles that follow.

(4) The implementation of a graphene cathode in a lithium-ion cell has led to an unprecedentedly high energy density, greater than 400 Wh/kg (based on total cell weight) in several cases. This is absolutely a revolution in lithium-ion battery industry. Also quite shocking is the observation that the graphene cathode-based lithium-ion cell can deliver a power density comparable to or better than those of symmetric supercapacitors that are noted for their superior ability to deliver high power. However, these supercapacitors are only capable of storing an energy density of typically <10 Wh/kg (mostly <6 Wh/kg).

We claim:

1. A lithium-ion cell comprising:
(a) a positive electrode (cathode) comprising graphene as the only cathode active material having a surface area to capture and store lithium thereon and wherein said graphene cathode is meso-porous having a specific surface area greater than 100 $m^2/g$;
(b) a negative electrode (anode) comprising an anode active material for inserting and extracting lithium during a charge and discharge of said cell, wherein said anode active material is mixed with a conductive additive and/or a resin binder to form a porous electrode structure, or coated onto a current collector in a coating or thin film form, and wherein said anode active material is not pre-lithiated and is lithium-free when the cell is made, and wherein the anode active material is selected from the group consisting of:
(A) non-lithiated silicon (Si), germanium (Ge), tin (Sn), lead (Pb), antimony (Sb), bismuth (Bi), zinc (Zn), aluminum (Al), titanium (Ti), cobalt (Co), nickel (Ni), manganese (Mn), cadmium (Cd), and mixtures thereof;
(B) non-lithiated alloys or intermetallic compounds of Si, Ge, Sn, Pb, Sb, Bi, Zn, Al, Ti, Co, Ni, Mn, Cd, and their mixtures;
(C) non-lithiated oxides, carbides, nitrides, sulfides, phosphides, selenides, tellurides, or antimonides of Si, Ge, Sn, Pb, Sb, Bi, Zn, Al, Fe, Ti, Co, Ni, Mn, Cd, and mixtures or composites thereof;
(D) non-lithiated salts or hydroxides of Sn; and
(E) non-lithiated graphite or carbon materials in a particle or fibrous form; and combinations thereof;
(c) a porous separator disposed between the anode and the cathode;
(d) a lithium-containing electrolyte in ionic contact with the anode and the cathode; and
(e) a lithium source disposed in at least one of the two electrodes when the cell is made.

2. The lithium-ion cell of claim 1 wherein said graphene cathode active material is selected from a single-layer sheet or multi-layer platelet of graphene, graphene oxide, graphene fluoride, hydrogenated graphene, nitrogenated graphene, boron-doped graphene, nitrogen-doped graphene, functionalized graphene, reduced graphene oxide, or a combination thereof.

3. The lithium-ion cell of claim 1 wherein said graphene cathode active material is pristine graphene containing no oxygen.

4. The lithium-ion cell of claim 1 wherein said anode active material is silicon, germanium, tin, or tin oxide.

5. The lithium-ion cell of claim 1 wherein said cathode has a specific surface area greater than 500 $m^2/g$.

6. The lithium-ion cell of claim 1 wherein said cathode has a specific surface area greater than 1,000 $m^2/g$.

7. The lithium-ion cell of claim 1 wherein said cathode has a specific surface area greater than 1,500 $m^2/g$.

8. The lithium-ion cell of claim 1 wherein said cathode active material contains a single-layer graphene sheet.

9. The lithium-ion cell of claim 1 wherein said cathode contains a conductive additive and/or a resin binder and said cathode forms a meso-porous structure having a pore size in the range of 2 nm and 50 nm.

10. The lithium-ion of claim 1 wherein said cathode further contains a conductive filler selected from graphite or carbon particles, carbon black, expanded graphite, carbon nanotube, carbon nano-fiber, carbon fiber, conductive polymer, or a combination thereof.

11. The lithium-ion cell of claim 1, wherein the lithium source comprises a lithium chip, lithium alloy chip, lithium foil, lithium alloy foil, lithium powder, lithium alloy powder, surface stabilized lithium particles, a mixture of lithium metal or lithium alloy with a lithium intercalation compound, lithium or lithium alloy film coated on a surface of an anode or cathode active material, or a combination thereof.

12. The lithium-ion cell of claim 1 wherein said anode active material contains a high rate capable anode material selected from nano-scaled particles or filaments of a transition metal oxide, $Co_3O_4$, $Mn_3O_4$, $Fe_3O_4$, or a combination thereof.

13. The lithium-ion cell of claim 1 wherein said anode active material contains a nano material having a dimension less than 100 nm.

14. The lithium-ion cell of claim 1, wherein the anode active material is a nano particle, nano disc, nano platelete, nano wire, nano-rod, nano belt, nano scroll, nano tube, nano filament, nano coating, or nano film.

15. The lithium-ion cell of claim 1, further comprising an anode current collector and/or cathode current collector that is a porous, electrically conductive material selected from metal foam, metal web or screen, perforated metal sheet, metal fiber mat, metal nanowire mat, porous conductive polymer film, conductive polymer nano-fiber mat or paper, conductive polymer foam, carbon foam, carbon aerogel, carbon xerox gel, graphene foam, graphene oxide foam, reduced graphene oxide foam, carbon fiber paper, graphene paper, graphene oxide paper, reduced graphene oxide paper, carbon nano-fiber paper, carbon nano-tube paper, or a combination thereof.

16. The lithium-ion cell of claim 1, wherein a discharge operation of said cell involves intercalating lithium into an inter-graphene space in a multi-layer graphene platelet and capturing and storing lithium on surfaces of a single-layer graphene sheet or multi-layer graphene platelet.

17. The lithium-ion cell of claim 1, wherein the electrolyte is organic liquid electrolyte, ionic liquid electrolyte, gel electrolyte, polymer electrolyte, or solid electrolyte containing a first amount of lithium ions when said cell is made.

* * * * *